United States Patent
Arimatsu

(10) Patent No.: US 10,177,619 B2
(45) Date of Patent: Jan. 8, 2019

(54) ROTATOR MEMBER TO BE FIXED TO ROTARY SHAFT OF ROTARY ELECTRIC MACHINE, ROTATOR INCLUDING ROTATOR MEMBER, AND METHOD FOR MANUFACTURING ROTARY ELECTRIC MACHINE AND ROTATOR

(71) Applicant: FANUC CORPORATION, Yamanashi (JP)

(72) Inventor: Yohei Arimatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/343,869

(22) Filed: Nov. 4, 2016

(65) Prior Publication Data

US 2017/0054337 A1 Feb. 23, 2017

Related U.S. Application Data

(62) Division of application No. 14/243,232, filed on Apr. 2, 2014, now Pat. No. 9,583,984.

(30) Foreign Application Priority Data

Apr. 3, 2013 (JP) .................................. 2013-077914
Mar. 3, 2014 (JP) .................................. 2014-041019

(51) Int. Cl.
  *H02K 1/30* (2006.01)
  *H02K 15/03* (2006.01)
  *H02K 1/27* (2006.01)

(52) U.S. Cl.
  CPC ............... *H02K 1/30* (2013.01); *H02K 1/278* (2013.01); *H02K 15/03* (2013.01)

(58) Field of Classification Search
  CPC ...................................................... H02K 15/03
  (Continued)

(56) References Cited

U.S. PATENT DOCUMENTS 4,918,802 A 4/1990 Schaefer
5,170,085 A 12/1992 Shinto
(Continued)

FOREIGN PATENT DOCUMENTS

CN 1211100 A 3/1999
CN 1823461 A 8/2006
(Continued)

OTHER PUBLICATIONS

English Translation of JP 2000-023399, published Jan. 21, 2000.
(Continued)

*Primary Examiner* — Burton Mullins
(74) *Attorney, Agent, or Firm* — Fredrikson & Byron, P.A.

(57) ABSTRACT

A rotator member 300 includes a tubular sleeve 301 having a first end surface and a second end surface, a plurality of magnet segments 311 circumferentially disposed at a radially outside of the sleeve 301, and a tubular member 321 adapted to cover the magnet segments 311 from a radially outside to hold the magnet segments 311 between the tubular member 321 and the sleeve 301. The sleeve 301 has an inner circumference surface that includes a tapered surface that gradually and outside the radial direction expands in a direction from the first end surface toward the second end surface.

10 Claims, 20 Drawing Sheets

(58) Field of Classification Search
USPC .................................... 310/156.12; 29/598
See application file for complete search history.

(56) References Cited

U.S. PATENT DOCUMENTS

| | | | | |
|---|---|---|---|---|
| 5,457,870 | A | * 10/1995 | Canders | ............... H02K 1/278 |
| | | | | 156/294 |
| 5,486,730 | A | 1/1996 | Ludwig | |
| 6,047,461 | A | 4/2000 | Miura et al. | |
| 6,441,523 | B1 | * 8/2002 | Koharagi | ............ H02K 1/2733 |
| | | | | 310/156.28 |
| 7,741,747 | B2 | * 6/2010 | Yamamura | ............ H02K 1/278 |
| | | | | 310/156.01 |
| 8,598,762 | B2 | * 12/2013 | Nakano | ................. H02K 1/278 |
| | | | | 310/156.28 |
| 2007/0114861 | A1 | 5/2007 | Bott | |
| 2010/0244607 | A1 | * 9/2010 | Fujimoto | ............... H02K 1/278 |
| | | | | 310/156.21 |
| 2012/0326555 | A1 | 12/2012 | Arimatsu et al. | |
| 2013/0113324 | A1 | * 5/2013 | Shepard | ............... H02K 1/2786 |
| | | | | 310/156.12 |
| 2013/0214620 | A1 | * 8/2013 | Kobayashi | ............ H02K 1/278 |
| | | | | 310/43 |

FOREIGN PATENT DOCUMENTS

| | | |
|---|---|---|
| CN | 102842977 A | 12/2012 |
| DE | 8803915 U1 | 6/1988 |
| DE | 4341514 A1 | 6/1995 |
| JP | H03212136 A | 9/1991 |
| JP | S6377442 U | 5/1998 |
| JP | 1189142 A | 3/1999 |
| JP | 2000023399 A | 1/2000 |
| JP | 2005027492 A | 1/2005 |
| JP | 2011125212 A | 6/2011 |
| JP | 2013009528 A | 1/2013 |

OTHER PUBLICATIONS

English Translation of DE 8803915, published Jun. 16, 1988.
English Translation of DE 4341514, published Jun. 8, 1995.
English Abstract for JP H032-12136, published Sep. 17, 1991.
Partial English Transation of Office Action of Counterpart Japanese Application, JP 2014-041019.
Office Action of Counterpart Japanese Application, JP 2014-041019.
English Machine Translation for CN 102842977, published Dec. 26, 2012.
English Machine Translation for CN 1823461, published Aug. 23, 2006.
English Machine Translation for CN 1211100, published Mar. 17, 1999.
Untranslated Decision to Grant a Patent mailed by Japan Patent Office (JPO) for Application No. JP 2014-041019 dated Jan. 6, 2015 3 pages.
English machine translation of Decision to Grant a Patent mailed by JPO for Application No. JP 2014-041019 dated Jan. 6, 2015, 3 pages.
Untranslated Notification of Reasons for Refusal mailed by Japan Patent Office (JPO) for Application No. JP 2014-041019, dated Aug. 5, 2014, 3 pages.
English machine translation of Decision of Refusal mailed by Japan Patent Office (JPO) for Application No. JP 2014-041019 dated Aug. 5, 2014, 3 pages.

* cited by examiner

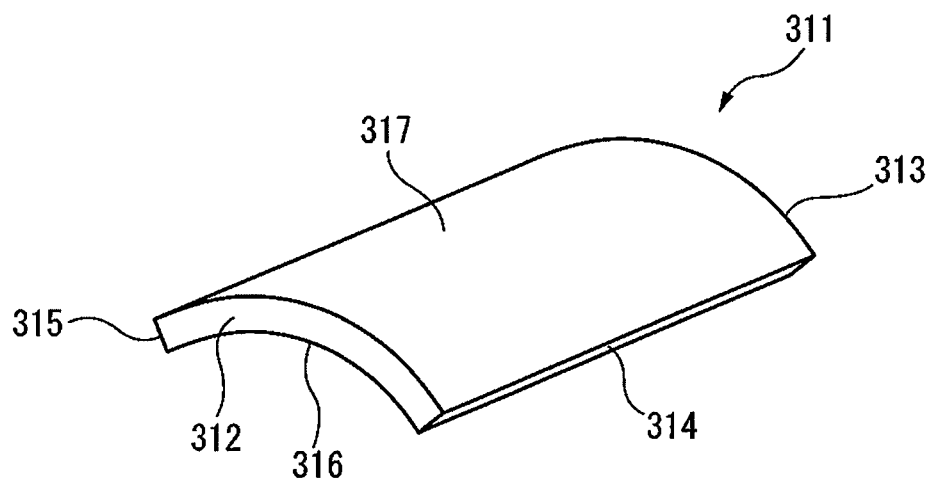
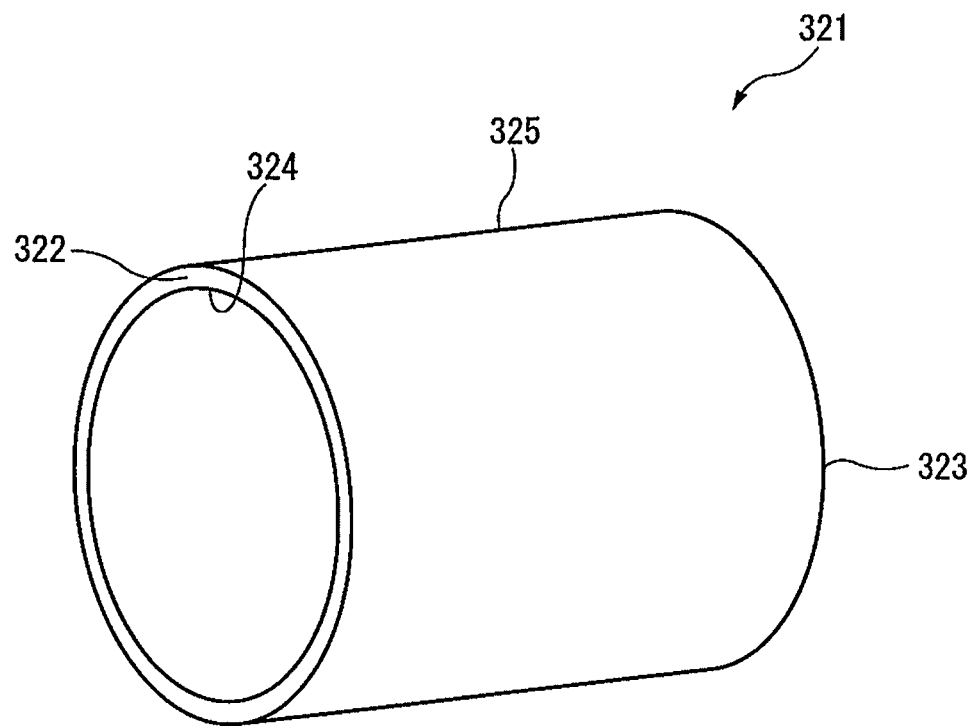

(a)　　　　　　　　　(b)

(a)　　　　　　　　　(b)

FIG. 23
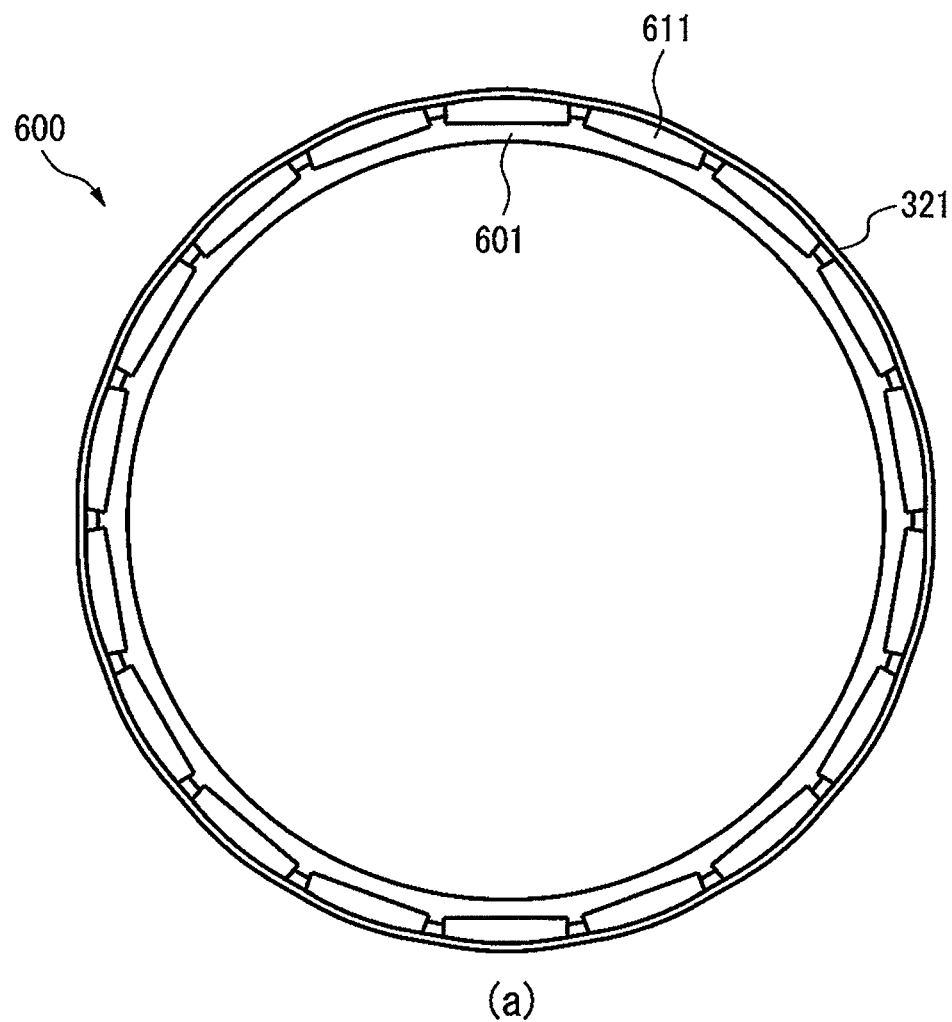
(a)
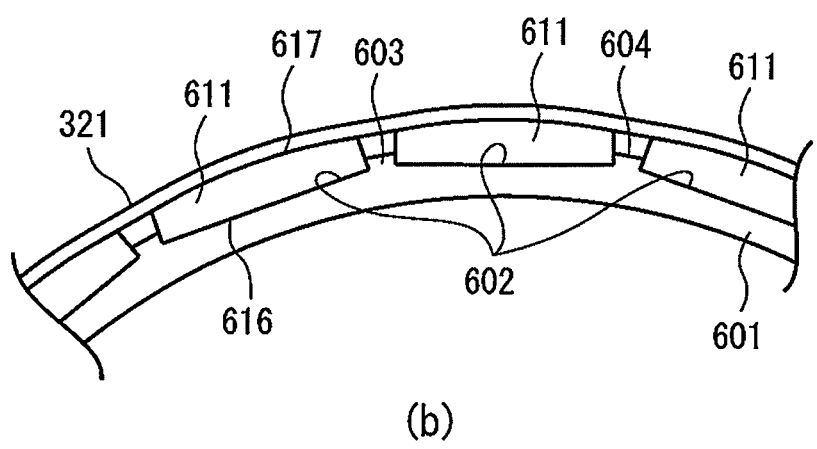
(b)

ROTATOR MEMBER TO BE FIXED TO ROTARY SHAFT OF ROTARY ELECTRIC MACHINE, ROTATOR INCLUDING ROTATOR MEMBER, AND METHOD FOR MANUFACTURING ROTARY ELECTRIC MACHINE AND ROTATOR

RELATED APPLICATIONS

This is a divisional of U.S. application Ser. No. 14/243,232, filed Apr. 2, 2014, which claims priority to Japanese Application No. 2014-041019, filed Mar. 3, 2014 and to Japanese Application No. 2013-077914, filed Apr. 3, 2013, the contents of each of which are herein incorporated by reference.

BACKGROUND ART

1. Technical Field

The present invention relates to a rotator member fixed to a rotary shaft of a rotary electric machine, a rotator including the rotator member, and a method for manufacturing the rotary electric machine and the rotator.

2. Description of Related Art

When an electric motor using permanent magnets as a rotator is rotated at a high speed, the electric motor has to be reinforced in order to endure centrifugal force generated during high speed rotation with respect to strength of the permanent magnets and a fixing structure of the magnets. In this case, generally speaking, such a reinforcement structure for covering the permanent magnets with a sleeve made of, for example, carbon fiber or titanium is provided. Japanese Laid-open Patent Publication No. 11-89142, for example, discloses a high speed synchronous motor provided with ring-shaped magnets including an outer circumference that is reinforced with carbon fiber reinforced plastic (CFRP).

The ring-shaped magnets disclosed in abovementioned Patent Literature 1 are under the limitation of upsizing due to a manufacturing restriction which makes it difficult to provide a larger electric motor by which a larger torque is provided. Furthermore, when the ring-shaped magnets are fitted over a magnetic ring and fixed to a rotary shaft with a significantly large interference for prevention of looseness during a high speed rotation, the ring-shaped magnets may crack because of expansion of the magnetic ring due to the significantly large interference.

On the contrary, an interference arranged to a degree so as not to crack the ring-shaped magnets does not provide a sufficiently large interference to the magnets and the magnetic ring, which presents the magnets and the magnetic ring an idle running, resulting in improperly low torque in a high speed rotation zone or a failure of a high speed rotation.

Furthermore, in the method disclosed in Patent Literature 1 mentioned above, the rotator member is fixed to the rotary shaft by a so called an "oil pressure fitting". Use of this method requires a complicated large manufacturing apparatus with complex and more difficult operations, which causes a problem of reduced manufacturing efficiency. In addition, the oil pressure fitting requires a hole in the magnetic ring (rotor sleeve) to guide oil pressure from outside to between the magnetic ring and the rotary shaft. However, a high speed rotation operation generates a stress concentration around the hole, and the maximum stress restrains the rotation from reaching the maximum speed. Moreover, the hole has to be precisely balanced, disposed and formed in consideration of the balance of the rotary shaft, which leads to a cause of an increased manufacturing cost.

Furthermore, the Patent Literature 1 indicates that an oil hole is removed by machining after a fixation of the rotator member and the rotary shaft by oil pressure fitting in order to avoid the stress concentration. The machining after completion of the rotator, however, is a risky process more than an increase of a simple process, which requires an attention to the magnetic attraction of the permanent magnets during the processing and a possible chemical damage to the rotator body itself caused by a cutting liquid. Therefore, such an operation has a problem of being significantly costly.

Moreover, Patent Literature 1 indicates that the sleeve is expected to have a fitting force remaining to the rotary shaft even when a rotation speed of an outer circumference of the rotator member is 250 m/s or higher. This is intended that the rotator member stably rotates at the maximum speed without looseness, i.e., idle running, of the rotator member. However, an electric motor used, for example, for a main shaft of a machine tool has such an important performance index that not only a rotator member does not idle but also how large a cutting toque is possibly generated. The qualification indicated in Patent Literature 1 is not satisfactory as a requirement for the rotator member not to slide at a fixed portion thereof under an application of the cutting load torque at the maximum rotation speed. Furthermore, although the similar problem exists between the magnets and the magnetic ring, Patent Literature 1 does not indicate any countermeasures thereto. Specifically, with only the fitting force of the sleeve with respect to the rotary shaft remaining at the maximum rotation speed, there is a problem that the magnets and the sleeve may slide in the rotational direction under increased load.

In consideration of the abovementioned problems, the present invention is intended to provide a rotator member and a rotator of a rotary electric machine which improves manufacturing efficiency, prevents magnets from damages during a manufacturing process, increases torque and output power of a rotary electric machine, and transmits the torque to a rotary shaft without fail.

SUMMARY OF INVENTION

A rotator member according to a first aspect of the present invention is fixed by press fitting to a rotary shaft of a rotary electric machine. The rotator member includes: a tubular sleeve having a first end at an axially first side and a second end at an axially second end; a plurality of magnet segments arranged in the circumferential direction at radially outside of the sleeve; and a tubular member covering a plurality of the magnet segments from the outside of the radial direction to hold the magnet segments between the tubular member and the sleeve. In order to make a press fitting assembly possible, the sleeve is provided with an inner circumference surface that includes a tapered surface which continuously expands radially outward as extending in a direction from the first end toward the second end. Also, the inner circumference surface of the sleeve does not include a portion where the radius of the inner circumference surface reduces in the direction from the first end toward the second end. The magnet segments may be separated in the circumferential direction, and may be or may not be separated into a multiple number in the axial direction of the rotary shaft.

Preferably, the tapered surface of the sleeve is a single linearly tapered surface, or includes a plurality of linearly tapered surfaces connected each other and inclined with respect to an axis of rotation at different angles from each other. The sleeve has a thick side that has a smaller diameter by the tapered structure. The thick side is preferably provided with an end portion to be sufficiently pressed by a press tool during a press fitting process. The end portion in the sleeve is thus thick, which allows an increased press fitting force to be applied to the end portion during a press fitting operation. The end portion of the sleeve preferably has a taper angle of 0° such that the end portion has an inner diameter that is constant.

In a preferable form, the inner circumference surface of the sleeve has a cylindrical surface of a constant radius extending from the first end toward the second end over a certain area. The tapered surface includes a linearly tapered surface extending from the cylindrical surface toward the second end. A gap is preferably formed at least partially between the sleeve and the magnet segments. In addition, the sleeve has an outer circumference that is preferably cylindrical, and each of the magnet segments has an inner circumference surface that is preferably circular arc. The curvature radius of the inner circumference surface of the magnet segment is larger than the radius of the outer circumference surface of the sleeve.

The tapered surface extends preferably from the first end to the second end. The tapered surface is preferably a linearly tapered surface. In this case, the preferable taper ratio of the linearly tapered surface is 1/200 to 1/30. Preferably, the sleeve has no holes with openings at the inner circumference surface thereof.

A movement prevention structure is preferably provided between the sleeve and the magnet segments to prevent a relative movement between the sleeve and the magnet segments. The tubular member is preferably composed of a material of great specific strength (tensile strength per unit density) including carbon fiber, glass fiber, nonmagnetic metal, aramid fiber, silicon carbide fiber, boron fiber, titanium alloy fiber, ultra high molecular weight polyethylene, or polybutylene terephthalate fiber. Furthermore, such FRP (fiber reinforced plastic) is also preferable as a material of the tubular member, that uses carbon fiber, glass fiber, aramid fiber, silicon carbide fiber, boron fiber, titanium alloy fiber, ultra high molecular weight polyethylene, or polybutylene terephthalate fiber. A composite material of a combination of any of these materials is also preferable. The tubular member may include nonmagnetic metal.

A rotator according to another aspect of the present invention includes a rotary shaft having an outer circumference surface expanding radially outward as extending in a direction from an axially first side toward an axially second side, and the rotator member described above, in which the sleeve is fixed to the rotary shaft on a radially outside of the rotary shaft, so that the second end of the sleeve is positioned to the axially second side of the rotary shaft relative to the first end of the sleeve. Since this structure requires no oil pressure fitting, no holes for oil are needed in the sleeve. Therefore, it is possible to avoid stress concentration around the holes, thereby advantageously provide increased maximum rotation speed.

The sleeve is deformed so as to expand radially outward by the rotary shaft when the rotator member is fixed to the rotary shaft, so that the outer circumference surface of the sleeve and inner circumference surfaces of the magnet segments are brought into a pressured contact with each other. The "pressured contact" means that a relative movement of elements is prevented by a pressing force between the surfaces thereof. However, the relative movement of these elements may be allowed when the pressing force is released. In particular, the prevention of the relative movement may or may not be maintained when the pressing force is released.

A substantially entire area (for example, more than 90%) of the inner circumference surface of the sleeve and the outer circumference surface of the rotary shaft are brought into a surface-to-surface contact for an axial distance where the tubular member is disposed. This structure provides a wider contact area (e.g. a region of more than 90%) between the inner circumference surface of the sleeve and the outer circumference surface of the rotary shaft to thereby reduce the pressing force between the surfaces, resulting in an easy press fitting operation between them. In consideration of convenient disassembling, a minimum groove may be provided to deliver lubricant oil to their surfaces under contact. In such a structure, the same value of at least more than 90% may be applied to the area that the surfaces are contacted and fixed with each other. Preferably, the sleeve deforms beyond its elastic deformation zone. A rotary electric machine according to another aspect of the present invention includes the rotator described above.

For a rotary electric machine under operation and including the rotator member being fixed to the rotary shaft, the tubular member is preferably given such an interference that fix torque between the sleeve and the rotary shaft, and between the magnet segments and the sleeve exceeds the maximum torque of the rotary electric machine at an allowed rotation speed.

With any stress concentration applied, the maximum rotation speed of the rotator is restrained by its limiting stress. Therefore, a structure to generate stress concentration is preferably excluded. Accordingly, the hole communicating between the outer circumference surface of the rotator and the radially inner surface of the rotary sleeve disclosed in the Patent Literature 1 mentioned above is not preferably provided. Exclusion of the hole avoids stress concentration and can further increase a rotation speed.

A method for manufacturing a rotator member to be press fitted and fixed to a rotary shaft according to another aspect of the present invention includes a step of: disposing a plurality of magnet segments in the circumferential direction on an outer circumference surface of a tubular sleeve that has a first end at an axially first side, a second end at an axially second side, and an inner circumference surface including a tapered surface that continuously expands radially outward as extending in a direction from the first end toward the second end; and disposing a tubular member to cover the plurality of magnet segments from outside the radial direction. The step of disposing the tubular member may include directly winding a material of the tubular member around the outer circumference of the magnet segments.

A method for manufacturing a rotator of a rotary electric machine including the rotator member manufactured by the method described above includes a step of: providing a rotary shaft that has an outer circumference surface at an area where the rotator member is fixed, the outer circumference surface expanding radially outward as extending in a direction from an axially first side to an axially second side; and fixing the rotator member outside the radial direction of the rotary shaft by an interference fitting.

The step of fixing the rotator member by an interference fitting includes fitting the sleeve over the rotary shaft from a side of the axially first side so that the second end of the sleeve is positioned at the axially second side relative to the first end; press fitting the sleeve over the rotary shaft so as to push the first end of the sleeve to the axially second side; and causing the sleeve to expand radially outward by the force of press fitting the sleeve, while the sleeve is press fitted to a predetermined fixing position.

Preferably, the rotator member includes a gap at least partially between the sleeve and the magnet segments. In the step of fixing the rotator member by the interference fitting, the outer circumference surface of the sleeve and the inner circumference surfaces of the magnet segments are brought into a surface-to-surface contact in their almost entire areas by causing the sleeve to expand radially outward so as to fill the gap.

Preferably, the outer circumference surface of the sleeve is cylindrical and the inner circumference surface of each magnet segment has a circular arc form. In this case, the inner circumference surface of the magnet segment has a curvature radius that is larger than a radius of the outer circumference surface of the sleeve. In the step of fixing the rotator member by the interference fitting, the outer circumference surface of the sleeve and the inner circumference surfaces of the magnet segments are brought into a surface-to-surface contact by causing the sleeve to expand radially outward.

BRIEF DESCRIPTION OF DRAWINGS

The abovementioned and other objects, features and advantages of the present invention will be further acknowledged with the description of the following preferred embodiments with reference to the drawings.

FIG. 6 is a perspective view of one of magnet segments illustrated in FIG. 3;

FIG. 7 is a perspective view of a tubular member illustrated in FIG. 3;

FIG. 23 illustrates the rotator member according to further another embodiment.

DETAILED DESCRIPTION

Figure 1:
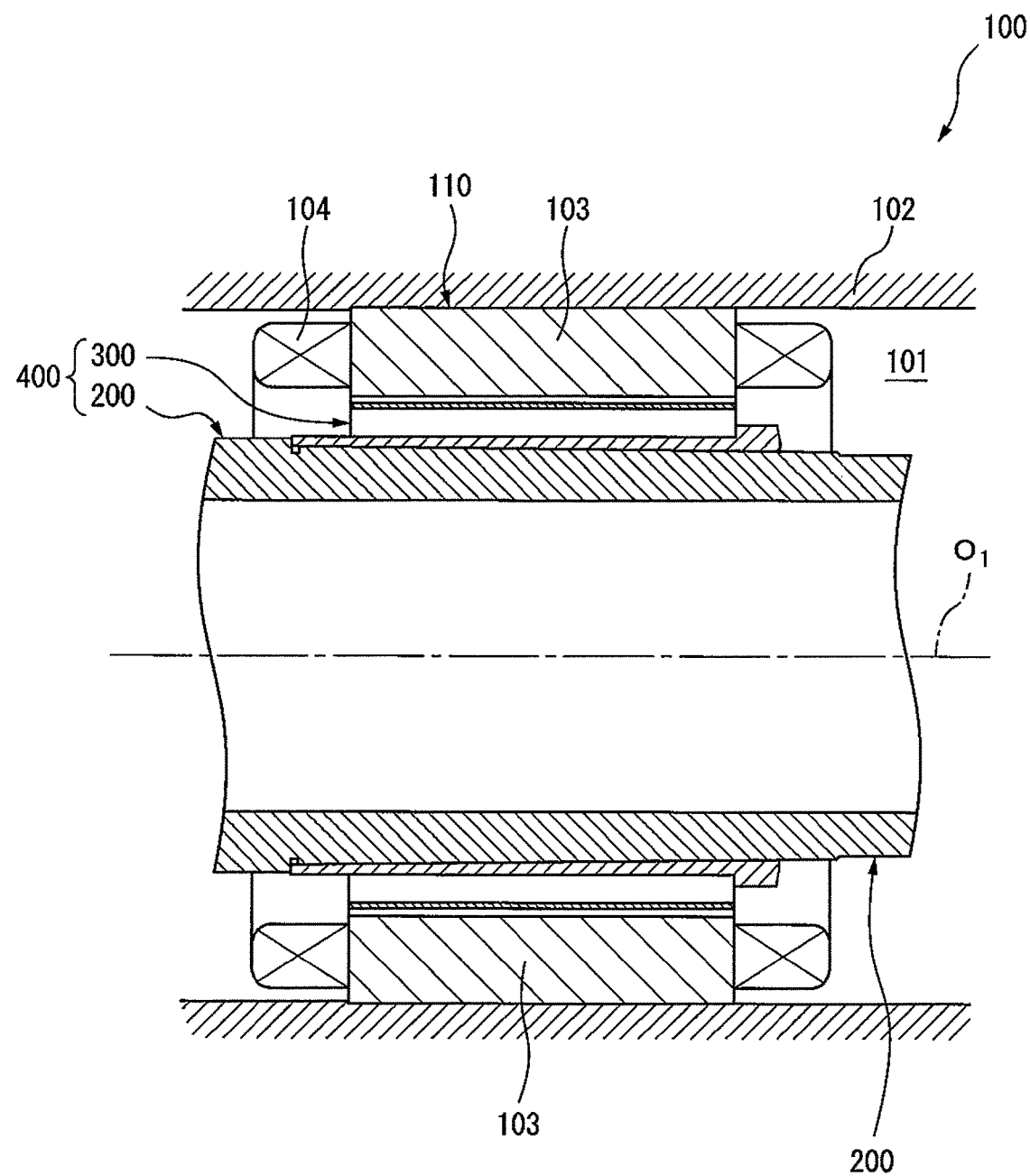
FIG. 1 is a sectional view of an electric motor of an embodiment according to the present invention.

An embodiment of the present invention will be described below in detail with reference to the drawing. Firstly, a structure of an electric motor 100 according to an embodiment of the present invention will be described referring to FIG. 1. It should be noted that, in the following description, a direction extending along the central axis of a rotary shaft of the electric motor 100 is designated as an axial direction, and the left side on the paper of FIG. 1 is designated as an axially front side while the right side thereon is designated as an axially rear side. It should also be noted, however, that the axially front side and the axially rear side in the following description are defined for a point of view of an easy and convenient understanding of the invention, and are not intended to limit the directions, e.g., front side and rear side, of the electric motor.

The electric motor 100 includes a housing 102 that defines an inner space 101, a stator 110 statically disposed in the inner space 101 of the housing 102, and a rotator 400 rotatably disposed radially inner side of the stator 110. The stator 110 includes a stator core 103 and coil 104 wound over the stator core 103. The stator core 103 is composed of laminated thin plates each made, for example, of an electromagnetic plate.

A power line (not illustrated) electrically connected to the coil 104 is extracted from the stator 110, and the power line is connected via a through hole disposed in the housing 102 to a power source (not illustrated) disposed outside the electric motor 100.

The rotator 400 includes a rotary shaft 200 axially extending in the inner space 101 and a rotator member 300 firmly fixed to outside the radial direction of the rotary shaft 200.

Figure 2:
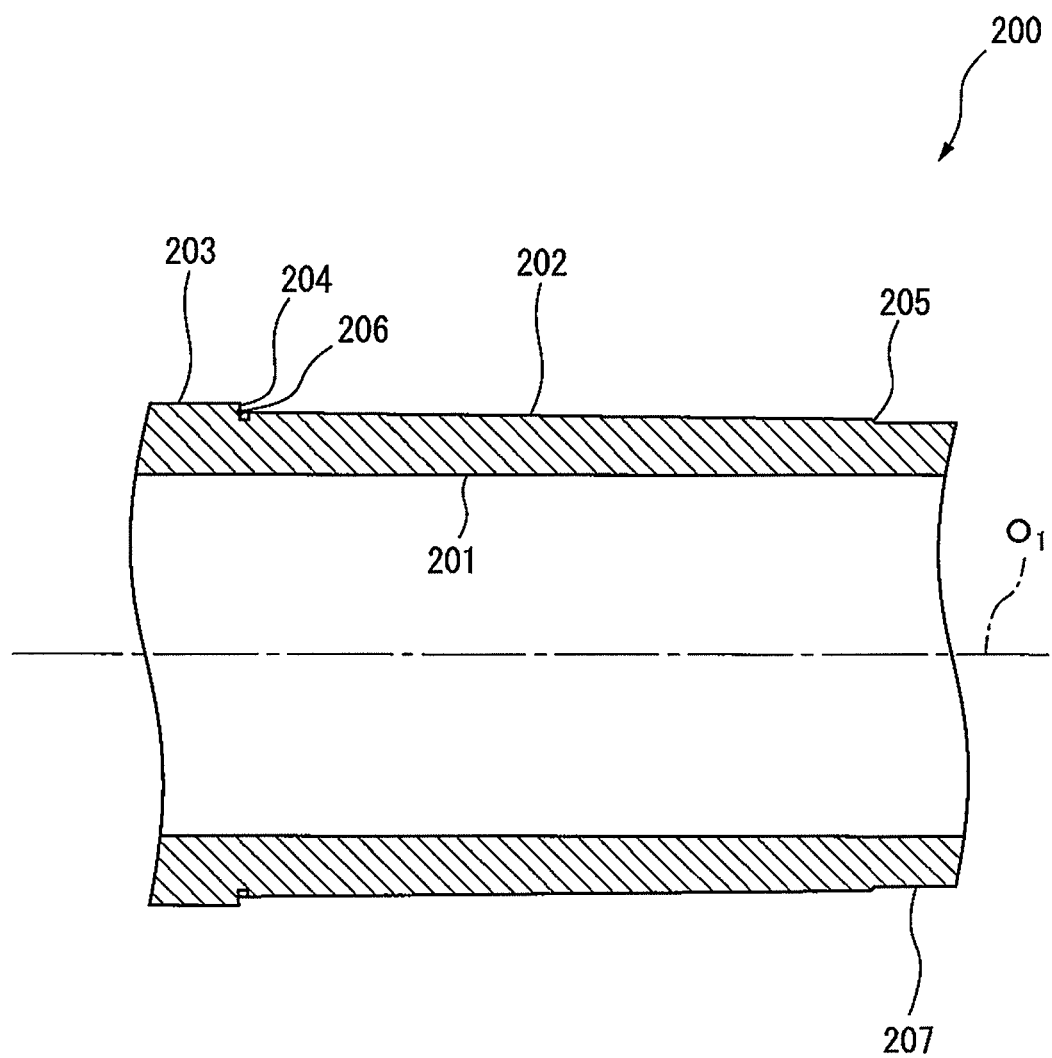
FIG. 2 is a sectional view of a rotary shaft illustrated in FIG. 1.

The rotary shaft 200 in this embodiment will be described below with reference to FIG. 2. The rotary shaft 200 is of a tubular configuration having a central axis $O_1$ and a center hole 201 that is concentric with the central axis $O_1$. In planning of built-in motor used for a main shaft of a machine tool, the rotary shaft 200 in this embodiment is provided with the center whole 201. However, the rotary shaft 200 in the present invention may be provided with other configurations. Specifically, the rotary shaft 200 may be composed of a solid material and may not be provided with the center hole 201.

The central axis $O_1$ of the rotary shaft 200 is an axis of rotation of the electric motor 100. The rotary shaft 200 is rotatably connected at an axially front side thereof to the housing 102 through a bearing (not illustrated) installed to a front side wall of the housing 102. Similarly, the rotary shaft 200 is rotatably connected at an axially rear side thereof to the housing 102 through a bearing (not illustrated) installed to a rear side wall of the housing 102.

The rotary shaft 200 has a tapered outer circumference surface 202 that expands radially outward as extending from the axially rear side to the axially front side. The rotary shaft 200 is provided with an axially-front-side portion 203 and a step 204 that serve as examples of stopper members for a manufacturing convenience. The tapered outer circumference surface 202 continuously extends from an axial rear end 205 to an axial front end 206. A cylindrical outer circumference surface 207 linearly extending in the axial direction is provided at an axially rear side of the axial rear end 205 of the tapered outer circumference surface 202.

The tapered outer circumference surface 202 may preferably include a linearly tapered surface, i.e., a conical surface. In such a configuration, the radius of the tapered outer circumference surface 202 increases linearly and gradually from the axial rear end 205 to the axial front end 206. The tapered outer circumference surface 202 may preferably include, for example, a linearly tapered surface of a tapered ratio of 1/200 to 1/30.

An abutment portion 203 and the step 204 serving as stop members are provided as a design example for an easier assembly in the manufacturing process. The abutment portion 203 has a cylindrical outer circumference surface that extends in the axial direction and projects outside the radial direction from the tapered outer circumference surface 202 so as to form the step 204 between the surface 202 and the axial front end 206.

Next, the rotator member 300 according to the embodiment will be described below with reference to FIGS. 3 to 7. The rotator member 300 includes a tubular sleeve 301, a plurality of magnet segments 311 disposed in the circumferential direction outside the radial direction of the sleeve 301, and a tubular member 321 covering the magnet segments 311 from outside the radial direction. In response to manufacturing and shaping reasons, the magnet segments 311 may be of a plurality of separated form, such that FIG. 3 exemplifies a two separated form in the axial direction.

Figure 5:
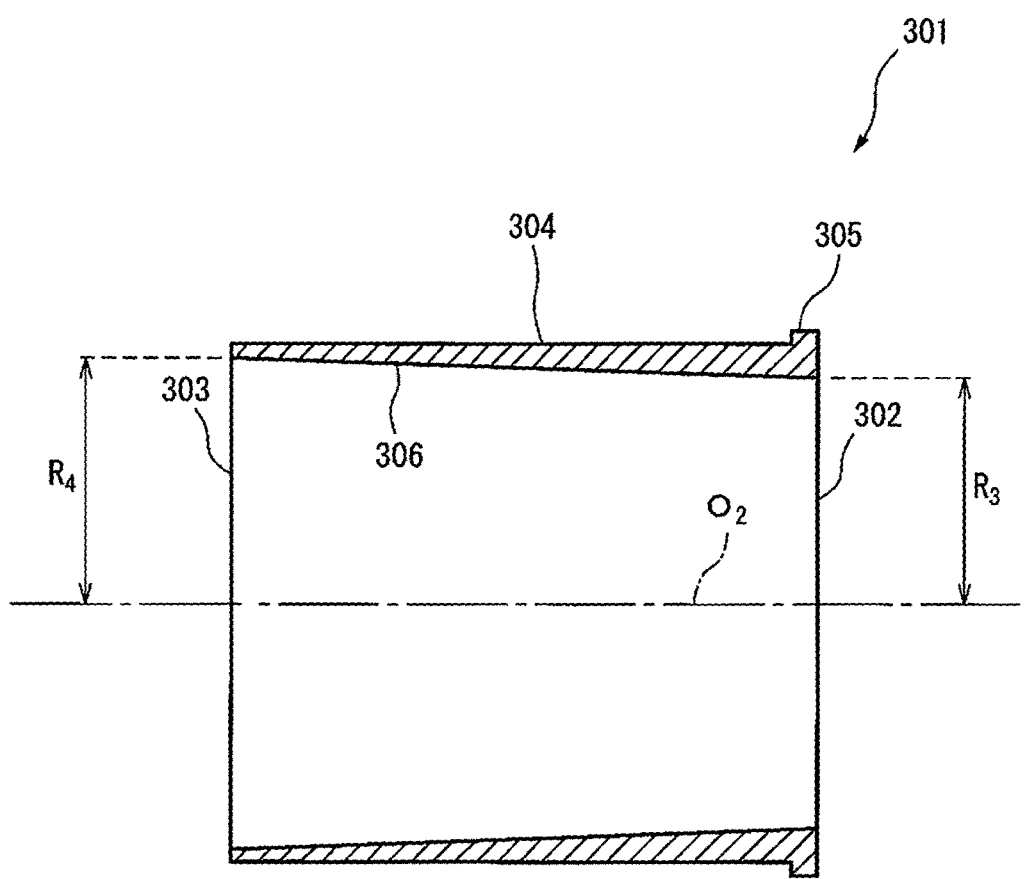
FIG. 5 is a sectional view of a sleeve illustrated in FIG. 3.

As illustrated in FIG. 5, the sleeve 301 is made of a tubular member with the center axis $O_2$ and has a first end 302 at an axially rear side thereof (i.e., axially first side), a second end 303 at an axially front side (i.e., axially second side) and a cylindrical outer circumference surface 304. The sleeve 301 is provided with a projection part 305 that projects radially outward from the outer circumference surface 304. The projection part 305 is provided as a design example for easier axial positioning of the magnets during the manufacturing process.

The sleeve 301 may be made of a magnetic metal material including, for example, SS400 or S45C. The sleeve 301 has a thickness that may preferably be arranged thin for an easy press fit operation of the sleeve 301 over the rotary shaft 200. The sleeve 301 may include a thickness of 1 mm to 2 mm at the thinnest part thereof. The press fitting operation of the sleeve 301 over the rotary shaft 200 will be described later.

The sleeve 301 in this embodiment has a tapered inner circumference surface 306 (i.e., tapered surface) that continuously expands radially outward as extending from the first end 302 to the second end 303. The tapered inner circumference surface 306 continuously extends from the first end 302 to the second end 303, and does not include a portion where the radius thereof reduces in a direction from the first end 302 to the second end 303 (i.e., axially frontward direction). In other words, the tapered inner circumference surface 306 has a radius that continuously increases in the axially frontward direction between the first end 302 and the second end 303 in their entire lengths.

The tapered inner circumference surface 306 may preferably be a linearly tapered surface. In this case, the radius of the tapered inner circumference surface 306 linearly enlarges from a radius $R_3$ of the tapered inner circumference surface 306 at the first end 302 to a radius $R_4$ of the tapered inner circumference surface 306 at the second end 303 in a direction from the first end 302 to the second end 303. The radius $R_4$ is larger than the radius $R_3$, i.e., $R_4 > R_3$. The tapered inner circumference surface 306 may preferably be of a linearly tapered surface of the taper ratio of, for example, 1/200 to 1/30. The range of this numeral value will be described later.

The degree of the taper of the tapered inner circumference surface 306 is arranged to correspond to the degree of the taper of the tapered outer circumference surface 202 of the rotary shaft 200. More specifically, when the same linearly tapered surface is given to the tapered outer circumference surface 202 of the rotary shaft 200 and the tapered inner circumference surface 306 of the sleeve 301, the same taper ratio (for example, 1/100) is given to the outer circumference surface 202 and the inner circumference surface 306.

In the assembled electric motor 100 illustrated in FIG. 1, the sleeve 301 is fixed by an interference fitting over the tapered outer circumference surface 202 of the rotary shaft 200 so that the center axis line $O_1$ of the rotary shaft 200 aligns with the center axis line $O_2$ of the sleeve 301. In this configuration, the second end 303 of the sleeve 301 is brought into contact with the step 204 of the abutment portion 203 serving as a stopper and provided for a convenient assembling. The radius $R_4$ of the tapered inner circumference surface 306 at the second end 303 is substantially the same as a radius of the axial front end 206 of the tapered outer circumference surface 202.

In addition, the tapered inner circumference surface 306 of the sleeve 301 and the tapered outer circumference surface 202 of the rotary shaft 200 tightly contact each other with a large surface pressure, so that the sleeve 301 is press-pushed outwardly in the radial direction by the rotary axis 200. An assembled structure of the sleeve 301 and the rotary shaft 200 will be described later.

As illustrated in FIG. 6, the magnet segments 311 each are made of a magnet piece of a circular arc form having an inner radius of a predetermined curvature radius. Specifically, the magnet segment 311 has an axially front end surface 312, an axially rear end surface 313, a circumferentially first end surface 314, a circumferentially second end surface 315, a radially inner surface 316 and a radially outer surface 317. The inner surface 316 of the magnet segment 311 has a circular arc form, while the outer surface 317 may have a curved or flat surface or a combination of the curved and flat surfaces.

In the embodiment illustrated in FIG. 6, although a clear illustration is given to the surfaces 312, 313, 314 and 315, these surfaces in actual cases may be of a curved surface or an very small surface held between a tapered surface and a curved surface and are sometimes vague because of a reason of a magnetic circuit design or a specification of an electric motor. In addition, each of the surfaces are defined by edges that are in actual cases chamfered and cut into a curved form, and thus the surfaces are not defined by pure drawing lines in some cases.

The inner surface 316 has a circular arc form with a predetermined curvature radius and extends in the axial direction so as to connect a radially inner side edge of the axially front end surface 312 to a radially inner side edge of the axially rear end surface 313. The outer surface 317 may include a circumferentially smooth curve line to configure, for example, a circular arc surface or other curved surfaces. The curvature radius of the inner surface 316 will be described later.

As illustrated in FIG. 7, the tubular member 321 is composed of a tube-shaped material extending in the axial direction. Specifically, the tubular member 321 has an axially front end surface 322, an axially rear end surface 323, a tubular inner surface 324 and a tubular outer surface 325. In the embodiment of FIG. 7, although the end surfaces 322 and 323 are clearly depicted, these end surfaces are sometimes unclearly observed due to a material or structure of the tubular member and a manufacturing method thereof.

The tubular member 321 has a durable strength with respect to a deformation force expanding outside the radial direction. In other words, the tubular member 321 has a substantially invariable radius (diameter). In addition, the tubular member 321 is preferably made of a nonmagnetic material from a point of view of prevention of reduced performance caused by heat generation or leakage of magnetic flux. Furthermore, the tubular member 321 is preferably small in density for reduced centrifugal force that is generated by rotation.

The tubular member 321 is preferably composed of a material of great specific strength (tensile strength per unit density) including carbon fiber, glass fiber, aramid fiber, silicon carbide fiber, boron fiber, titanium alloy fiber, ultra high molecular weight polyethylene and polybutylene terephthalate fiber. Furthermore, FRP (fiber reinforced plastic) is also preferable as a material of the tubular member 321, which FRP includes carbon fiber, glass fiber, aramid fiber, silicon carbide fiber, boron fiber, titanium alloy fiber, ultra high molecular weight polyethylene and polybutylene terephthalate fiber. A composite material of a combination of any of these materials is also preferable. Moreover, the tubular member 321 may be composed of austenitic stainless or nonmagnetic metal including titanium alloy.

Figure 3:
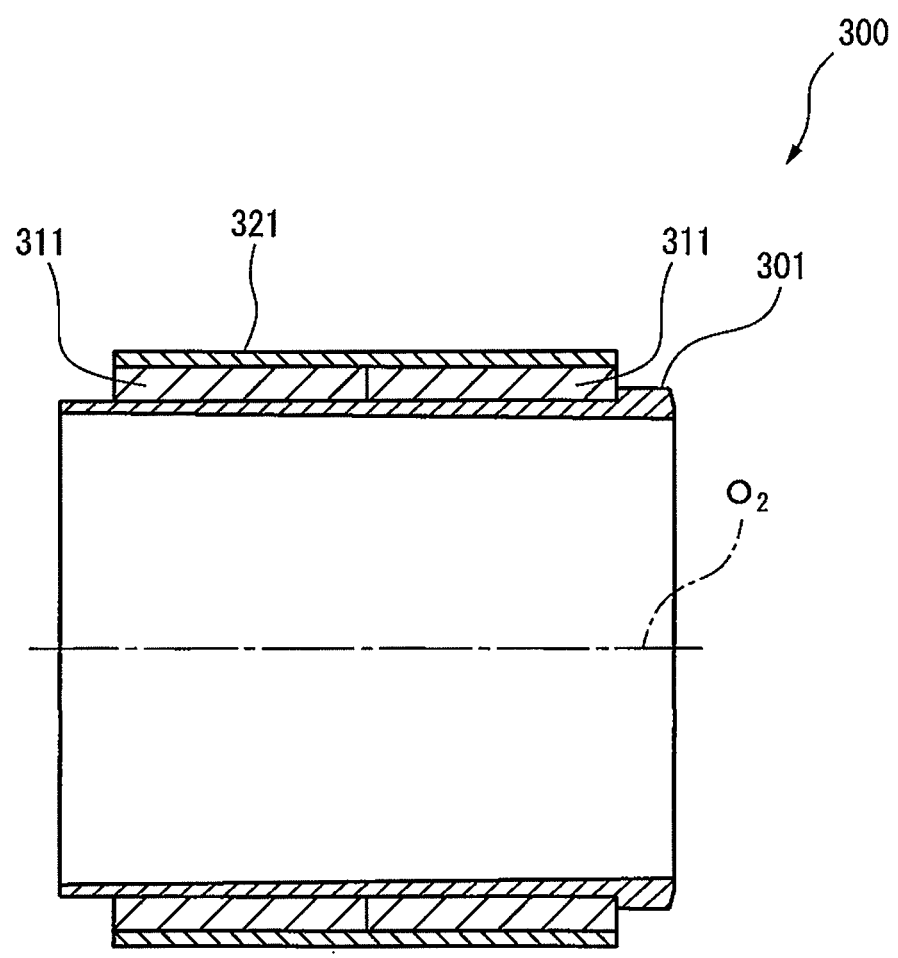
FIG. 3 is a sectional view of a rotator member illustrated in FIG. 1.
Figure 4:
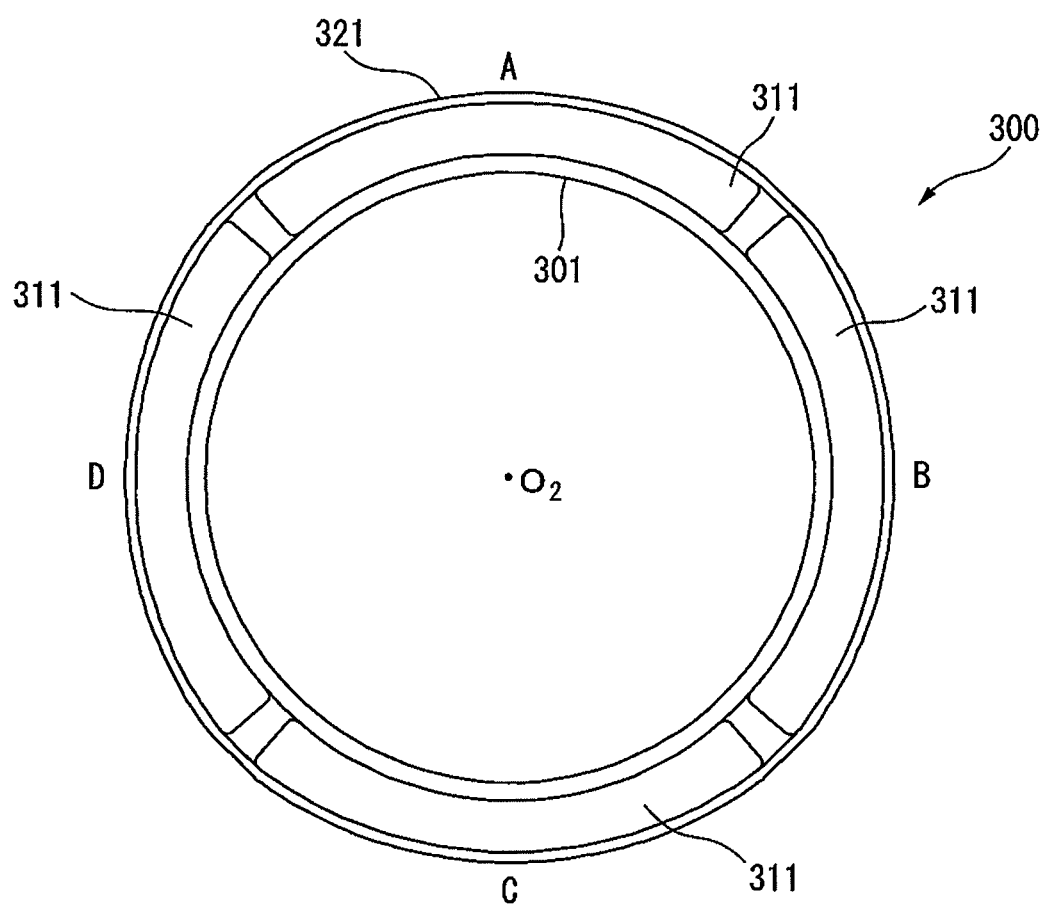
FIG. 4 is an external view of the rotator member illustrated in FIG. 1 viewed from an axial direction.

In the embodiment illustrated in FIGS. 3 and 4, the assembled rotator member 300 includes a total of eight magnet segments 311. Specifically, two magnet segments 311 at a circumference position A in FIG. 4 are axially and adjacently disposed to form a pair. Similarly, two magnet segments 311 at circumference positions B, C and D in FIG. 4 are axially and adjacently disposed to form a pair, respectively.

Accordingly, the rotator member 300 according to the embodiment includes four pairs of magnet segments 311 that are circumferentially disposed on the outer circumference surface 304 of the sleeve 301 at substantially equal intervals. The magnet segments 311 at the axially rear side are axially positioned by a structure such as, for example, a projection part 305 formed on the sleeve 301.

The tubular member 321 is fitted to cover and surround all the magnet segments 311 of four circumferential pairs (in total of eight) from outside the radial direction of the segments 311. In the assembled electric motor 100 illustrated in FIG. 1 as described hereinbefore, the sleeve 301 is press-pushed radially outward by the rotary shaft 200. This press-fit force causes the sleeve 301 to deform outside the radial direction, resulting in pushing each of the magnet segments 311 outside the radial direction.

As described above, the tubular member 321, on the other hand, has a durable strength against deformation to expand outside the radial direction. Therefore, the tubular member 321 upon receiving the pressure applied from the magnet segments 311 uses its reaction force to push the magnet segments 311 back inside the radial direction.

Such a configuration allows the magnet segments 311 to be firmly held between the sleeve 301 and the tubular member 321. Therefore, this configuration prevents a relative movement of the magnet segments 311 with respect to the sleeve 301 and the tubular member 321 even during a high speed operation of the rotator member 300 in a driving operation of the electric motor 100.

Figure 8:
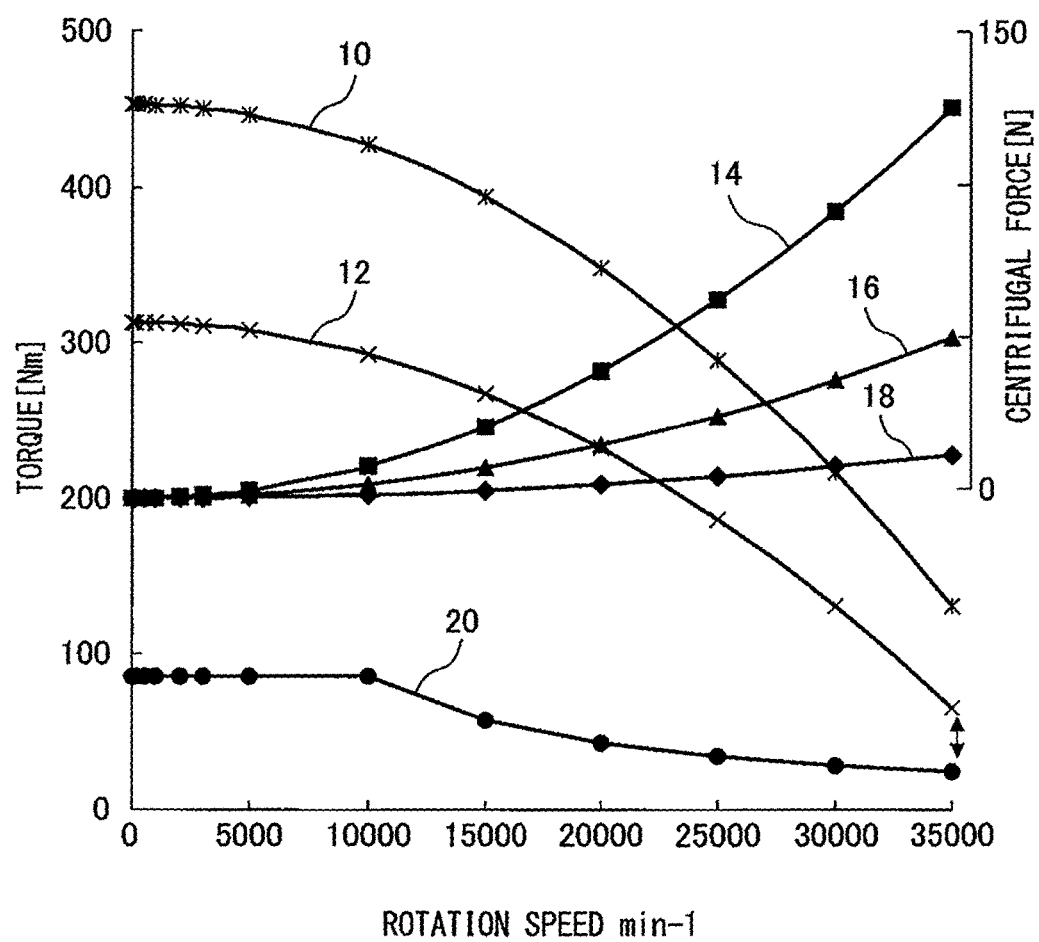
FIG. 8 is a graph illustrating centrifugal forces acted on the rotary shaft, the sleeve, and the magnet segments, fix torque between the rotary shaft and the sleeve, and fix torque between the sleeve and the magnet segments, all relative to a rotation speed of the electric motor.

This mechanism will be further described in detail with reference to FIGS. 8 to 10. FIG. 8 illustrates: the centrifugal forces acted on each members; fix torque between the rotary shaft 200 and the sleeve 301; and fix torque between the sleeve 301 and the magnet segments 311, all relative to the rotation speed of the electric motor 100. The both fix torque decrease in response to increased rotation speed. The "fix torque" has such a value that a circumferential friction force between contact surfaces of two members is multiplied by a radial distance between an axis of rotation and the contact surfaces (i.e., radius of the contact surface). A larger fix torque indicates difficulty in a relative circumferential movement (difficulty in slipping) of one member with respect to the other member.

In FIG. 8, a line 10 indicates fix torque between the rotary shaft 200 and the sleeve 301, while a line 12 indicates fix torque between the sleeve 301 and the magnet segments 311. Furthermore, lines 14, 16 and 18 in FIG. 8 indicate centrifugal forces of the magnet segments 311, the sleeve 310 and the tubular member 321, respectively. A line 20 indicates the maximum torque of the electric motor 100.

As illustrated in FIG. 8, the fix torque 10 and 12 are considerably larger than the maximum torque 20 of the electric motor 100 during a shutdown period (i.e., the rotation speed is zero), but decrease in relation to an increment rotation speed of the electric motor 100 so as to gradually reaching the maximum torque 20.

The maximum torque 20 of the electric motor 100 decreases near 10000 min-1 due to an example model motor that is fixed to include the maximum output power of 90 kW. In general, when the rotation speed is increased under constant torque, an output power is considered to increase endlessly in accordance with the expression (output power of electric motor=torque×rotation speed), which is not realistic, however, due to a limitation of power supply from a driving power source. Therefore, in designing electric motors for high speed and high torque, the torque is adapted to decrease from a certain rotation speed to provide a constant output power, instead. Accordingly, the torque in this example decreases near the point 10000 min-1.

Figure 9:
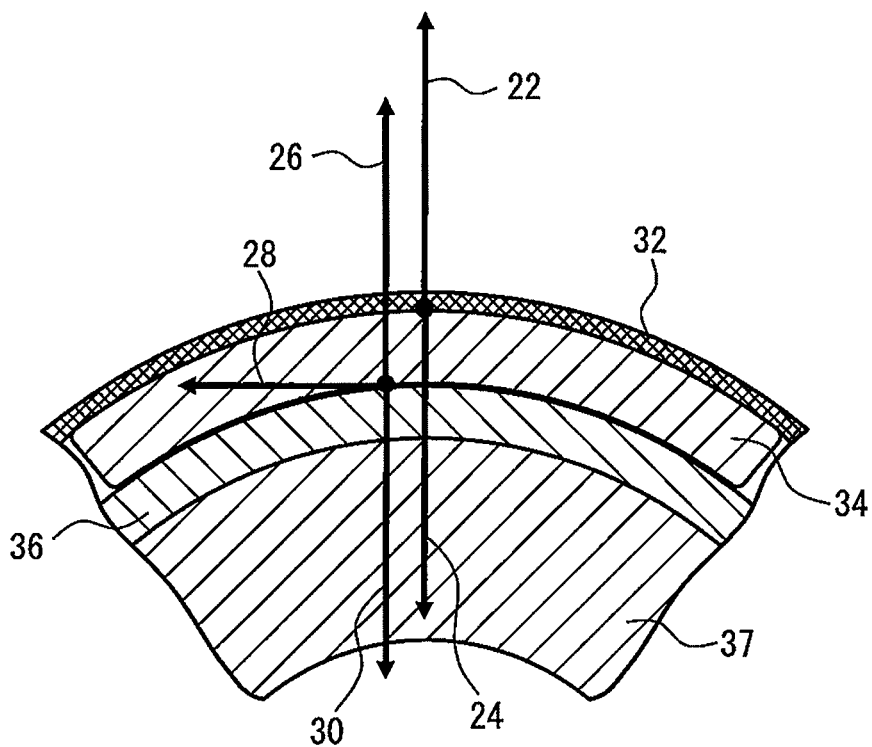
FIG. 9 illustrates balance of forces among the tubular member, the magnet segments and the sleeve during a shutdown period of the electric motor.
Figure 10:
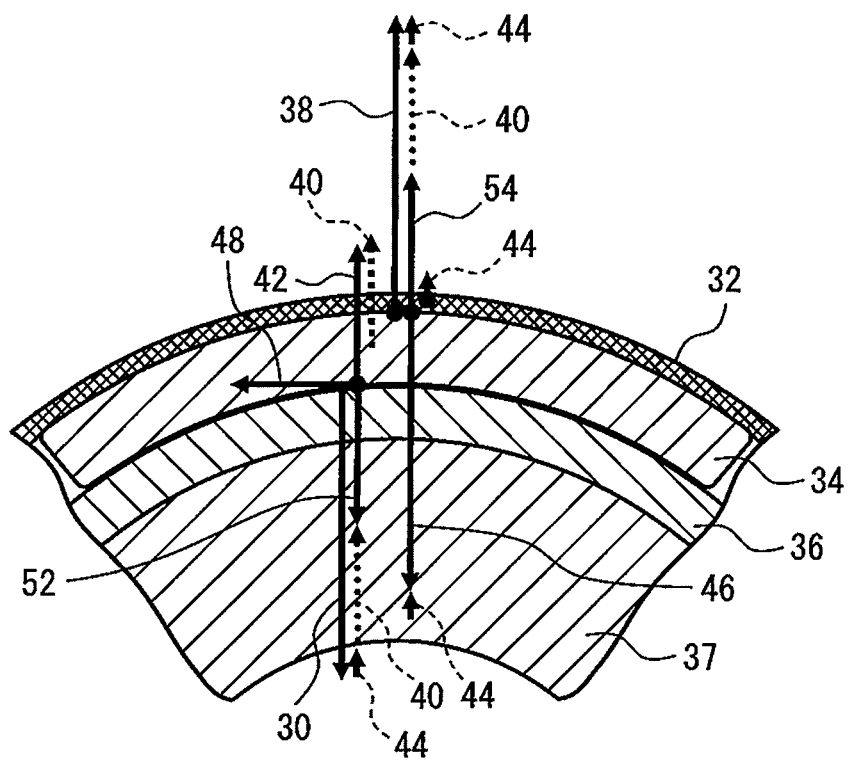
FIG. 10 illustrates balance of forces among the tubular member, the magnet segments and the sleeve during a rotation period of the electric motor.

FIGS. 9 and 10 illustrate force balances in a shutdown period and a rotation period. For clarity of the drawing and the description, FIGS. 9 and 10 principally illustrate the force relationship between magnet segment 34 and sleeve 36. Although the force relationship between sleeve 36 and rotary shaft 37 is not illustrated, a person skilled in the art could easily understand that the relationship between sleeve 36 and rotary shaft 37 could be explained in a similar way as that between magnet segment 34 and sleeve 36.

FIG. 9 illustrates a force balance between the tubular member 32, the magnet segment 34 and the sleeve 36 during a shutdown period of an electric motor. An arrow 30 in FIG. 9 indicates a force applied from the magnet segment 34 to the sleeve 36. An arrow 26 indicates a reaction force applied from the sleeve 36 to the magnet segment 34. An arrow 28 indicates a friction force between the sleeve 36 and the magnet segment 34. The friction force 28 has such a value that the force 26 is multiplied by a friction coefficient between the sleeve 36 and the magnet segment 34. An arrow 24 in FIG. 9 indicates a force applied from the tubular member 32 to the magnet segment 34 (i.e., a compressive holding force of the tubular member 32). An arrow 22 indicates a reaction force applied from the magnet segment 34 to the tubular member 32.

Thus, only the force relationship between the magnet segment 34 and sleeve 36 are explained, for clarity of the drawing and the description. However, a person skilled in the art could easily understand that the force relationship between sleeve 36 and rotary shaft 37 could be explained in a similar way, except the followings, i.e., a force derived from the interference of the sleeve 36 and a force applied to the sleeve 36 from the magnet segment 34 should be added to a force applied to rotary shaft 37 from the sleeve 36.

FIG. 10 illustrates force balances among the tubular member 32, the magnet segment 34 and the sleeve 36 during a rotation period of the electric motor. An arrow 52 in FIG. 10 indicates a force applied from the magnet segment 34 to the sleeve 36. An arrow 42 indicates a reaction force applied from the sleeve 36 to the magnet segment 34. An arrow 48 indicates a friction force between the sleeve 36 and the magnet segment 34. An arrow 46 indicates a force applied from the tubular member 32 to the magnet segment 34 (i.e., a compressive holding force of the tubular member 32). An arrow 54 indicates a reaction force transmitted from the sleeve 36 to the tubular member 32 through the magnet segment 34. An arrow 38 indicates a total force applied to the tubular member 32. An arrow 40 in dotted line indicates a centrifugal force acted on the magnet segment 34. A dotted arrow 44 indicates a centrifugal force acted on the tubular member 32.

As illustrated in FIG. 10, the compressive holding force 46 applied by the tubular member 32 during a rotation period has such a value that the centrifugal force 44 acted on the tubular member 32 during the rotation period is subtracted from the compressive holding force 24 during a shutdown period as illustrated in FIG. 9. Therefore, the tubular member 32 is desirable to include light mass and great strength, i.e., high specific strength. Accordingly, the tubular member 32 is preferably made of a material that includes carbon fiber as a main component. The tubular member 32 having light mass is given less reduced compressive holding force 24 due to centrifugal force, which allows increased force to hold the magnet segment and the sleeve with further improved rotation speed.

The force 52 illustrated in FIG. 10 is smaller than the force 30 illustrated in FIGS. 9 and 10 because of the centrifugal force 40 of the magnet segment 34 and the centrifugal force 44 of the tubular member 32. This reduces the force 42, and thus the friction force 48 between the sleeve 36 and the magnet segment 34. Accordingly, the fix torque between the sleeve 36 and the magnet segment 34 during a rotation period of the electric motor 100 is reduced.

Thus, only the force relationship between the magnet segment 34 and sleeve 36 are explained, for clarity of the drawing and the description. However, a person skilled in the art could easily understand that the force relationship between sleeve 36 and rotary shaft 37 could be explained in a similar way, except the following, i.e., a force derived from the interference of the sleeve 36 and a force applied to the sleeve 36 from the magnet segment 34 should be added to the force applied to rotary shaft 37 from the sleeve 36 and the centrifugal force acted on the sleeve 36 should be taken into consideration. As a result, the fix torque between the sleeve 36 and the rotary shaft 37 during a rotation period of the electric motor 100 is also reduced.

Not only the compressive holding force 46 of the tubular member 32 has to be remained under the maximum rotation speed of the motor, but also the circumferential fix torque between the sleeve 36 and the magnet segment 34, and between the sleeve 36 and the rotary shaft 37, given by the compressive holding force 46 has to exceed the maximum torque of the motor at every rotation speed all the time. An allowance of more than five times the maximum torque of the motor is preferable.

Therefore, for the rotator member 300 in this embodiment, an interference of the tubular member 321 is set such that the fix torque between the sleeve 301 and the rotary shaft 200 exceeds the maximum torque of the rotary electric machine 100, and the fix torque between the magnet segments 311 and the sleeve 301 exceeds the maximum toque of the electric motor 100, both in a full range in which the rotary electric machine 100 is operable.

With such an arrangement, as illustrated in FIG. 8, the fix torque 10 between the rotary shaft 200 and the sleeve 301 and the fix torque 12 between the sleeve 301 and the magnet segment 311 exceed the maximum torque 20 of the electric motor 100 at any rotation speed of the electric motor 100. This prevents the relative movement between the rotary shaft 200 and the sleeve 301, and between the sleeve 301 and the magnet segment 311 in a driving operation of the electric motor 100.

Next, an operation of the electric motor 100 will be described with reference to FIGS. 1 to 7. Upon receiving a current from a power source outside the electric motor 100 to a coil 104 via a power line, the stator 110 generates a rotating magnetic field around the central axis $O_1$. The rotating magnetic field generated by the stator 110 applies an electromagnetic force to the magnet segments 311 of the rotator member 300 in the circumferential direction. Accordingly, the rotator member 300 rotates integrally with the rotary shaft 200.

Next, a manufacturing method for the rotator member 300 according to the embodiment of the present invention will be descried below with reference to FIGS. 11 to 19. The manufacturing method S10 for the rotator member 300 includes step S1 to step S5. Specifically, in the step S1 the sleeve 301 is provided. For example, machining is applied to inner and outer circumference surfaces of a tubular material to form the tapered inner circumference surface 306 and the tapered outer circumference surface 304. Furthermore, if need be, the projection part 305, for example, is formed for convenience of an assembling process. The radius $R_4'$ of the tapered inner circumference surface 306 at the second end 303 of the sleeve 301 provided in the step S1 is smaller than the radius $R_4$ in the assembled electric motor 100 (refer to FIG. 17). Similarly, the radius $R_3'$ of the tapered inner circumference surface 306 at the first end 302 of the sleeve 301 provided in the step S1 is smaller than the radius $R_3$ in the assembled electric motor 100.

In the step S2 the magnet segments 311 are provided. Specifically, eight magnet segments 311 are provided each of which has a substantially circular arc configuration and is provided with the inner surface 316 having a predetermined curvature radius. In the step S3 the tubular member 321 is provided. The material of the tubular member 321 is preferably of great specific strength (tensile strength per unit density) that includes carbon fiber, glass fiber, aramid fiber, silicon carbide fiber, boron fiber, titanium alloy fiber, ultra high molecular weight polyethylene and polybutylene terephthalate fiber. Furthermore, any one of FRP (fiber reinforced plastic) including abovementioned material(s)

austenitic stainless or titanium, nonmagnetic metal such as titanium alloy is preferable, and a composite material thereof is also preferable.

The step S1 to the step S3 may be carried out concurrently or in any order. In addition, the step S1 to the step S3 may be carried out in respective manufacturing locations, or at least two steps among the steps S1 to S3 may be carried out at the same manufacturing location.

In the step S4 total of eight magnet segments 311 are disposed on the outer circumference surface 304 of the sleeve 301. This step S4 will be described below with reference to FIG. 13. First, two magnet segments 311 provided in the step S2 are adjacently placed in the axial direction at a circumference position A to form a pair and are placed on the outer circumference surface 304 of the sleeve 301. Similarly, two magnet segments 311 are adjacently placed in the axial direction at each of circumference positions B, C and D to make a pair and are placed on the outer circumference surface 304 of the sleeve 301.

The pair of magnet segments 311A at the circumference position A has such a high magnetic field that a side of the inner surface 316 results in a south pole and a side of the outer surface 317 results in a north pole. On the other hand, the pair of magnet segments 311B at the circumference position B has such a magnetic field that a north pole is given to a side of the inner surface 316 while a south pole is given to a side of the outer surface 317.

Furthermore, the pair of magnet segments 311C at the circumference position C has such a magnetic field that a south pole is given to a side of the inner surface 316 while a north pole is given to a side of the outer surface 317. In the similar manner, the pair of magnet segments 311D at the circumference position D has such a magnetic field that a north pole is given to a side of the inner surface 316 while a south pole is given to a side of the outer surface 317.

In summing up, the pairs of the magnet segments 311A to 311D in this embodiment are arranged in the circumferential direction such that the south pole and the north pole thereof alternate in the circumferential direction. It is preferable that the magnet segments 311 in this embodiment are magnetized prior to the step S4. This allows the pairs of the magnet segments 311 to draw with one another in a magnetic field generated by the magnet segments 311, resulting in an easy positioning operation of the magnet segments 311 on the outer circumference surface 304 of the sleeve 301.

In the step S5 the tubular member 321 is disposed so as to cover the magnet segments 311 from outside the radial direction. Specifically, the tubular member 321 provided in the step S3 is fitted outside the radial direction of the magnet segments 311 in such a manner that the inner surface 324 of the tubular member 321 faces the outer surfaces 317 of outside each radial direction of the magnet segments 311. At this stage, the tubular member 321 and the magnet segments 311 may be of a loose fitting or a small degree of interference fitting. For the interference fitting, only a little interference for prevention of fall off of the tubular member 321 is sufficient.

Figure 11:
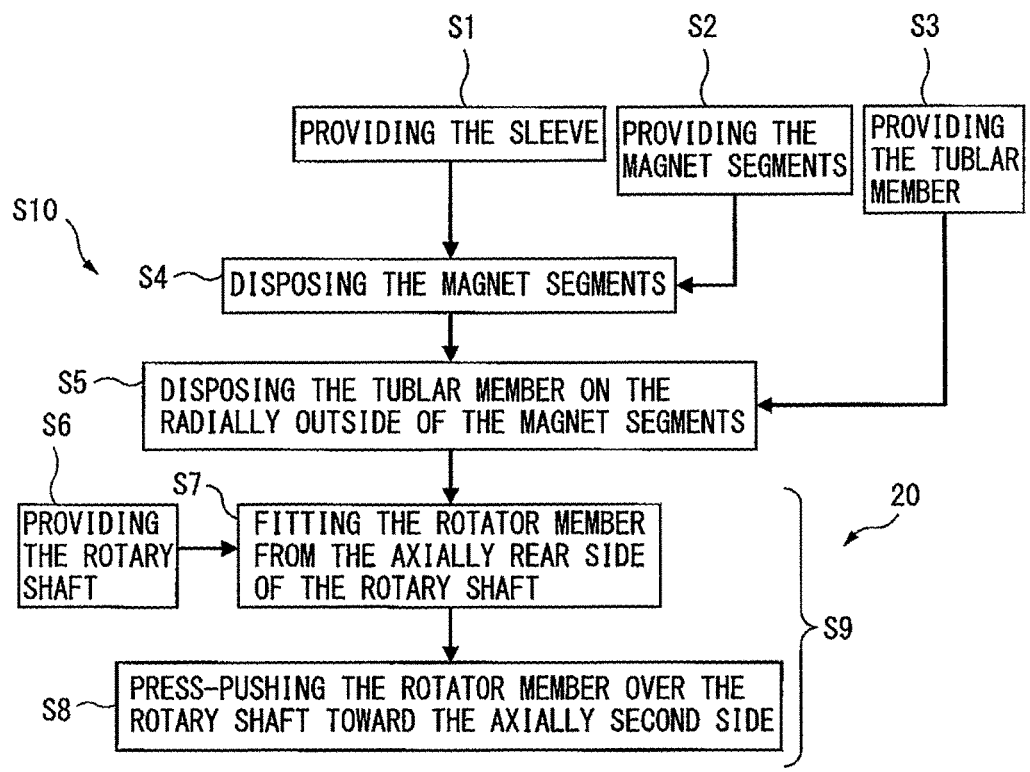
FIG. 11 is a flowchart illustrating a manufacturing method of the rotator member and the rotator according to an embodiment of the present invention.
Figure 12:
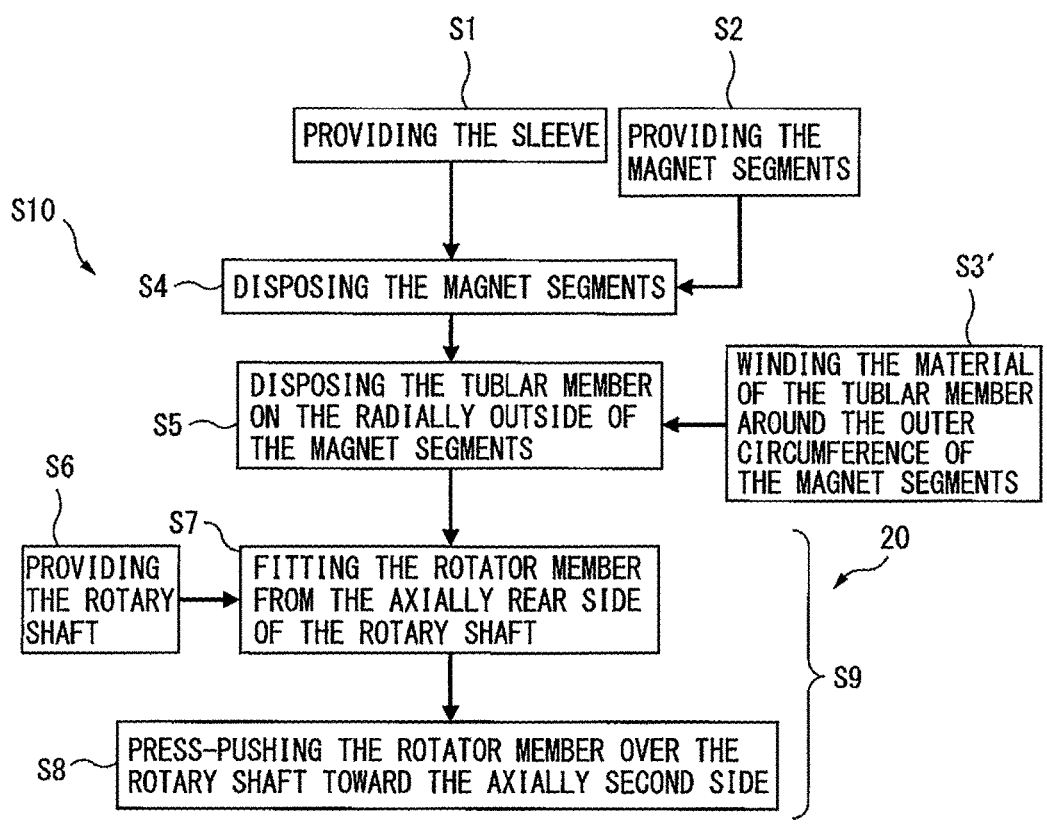
FIG. 12 is a flowchart illustrating a manufacturing method of the rotator member and the rotator according to another embodiment of the present invention.
Figure 13:
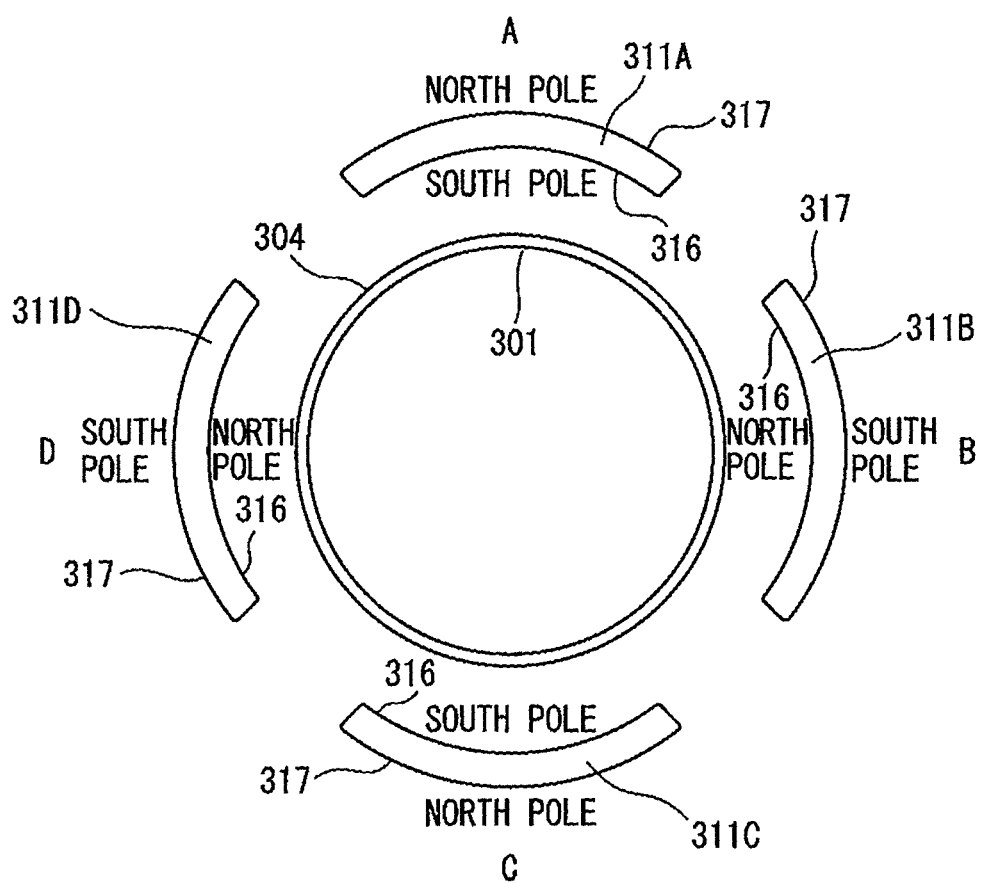
FIG. 13 illustrates a step of disposing the magnet segments to the sleeve.

FIG. 12 illustrate another embodiment of the manufacturing method of the rotator member 300. In place of the step S3 in FIG. 11, in the step S5, the tubular member 321 may be disposed on the magnet segments 311 by directly winding a material of the tubular member 321 around the outer circumference of the magnet segments 311 (step S3'). For example, a material in the form of string, belt, or sheet may be used to cover the outer circumference of the magnet segments 311 to form a certain thickness of a wound layer resulting from a number of windings of the material in the rotational direction around the outer circumference of the magnet segments 311.

Figure 15:
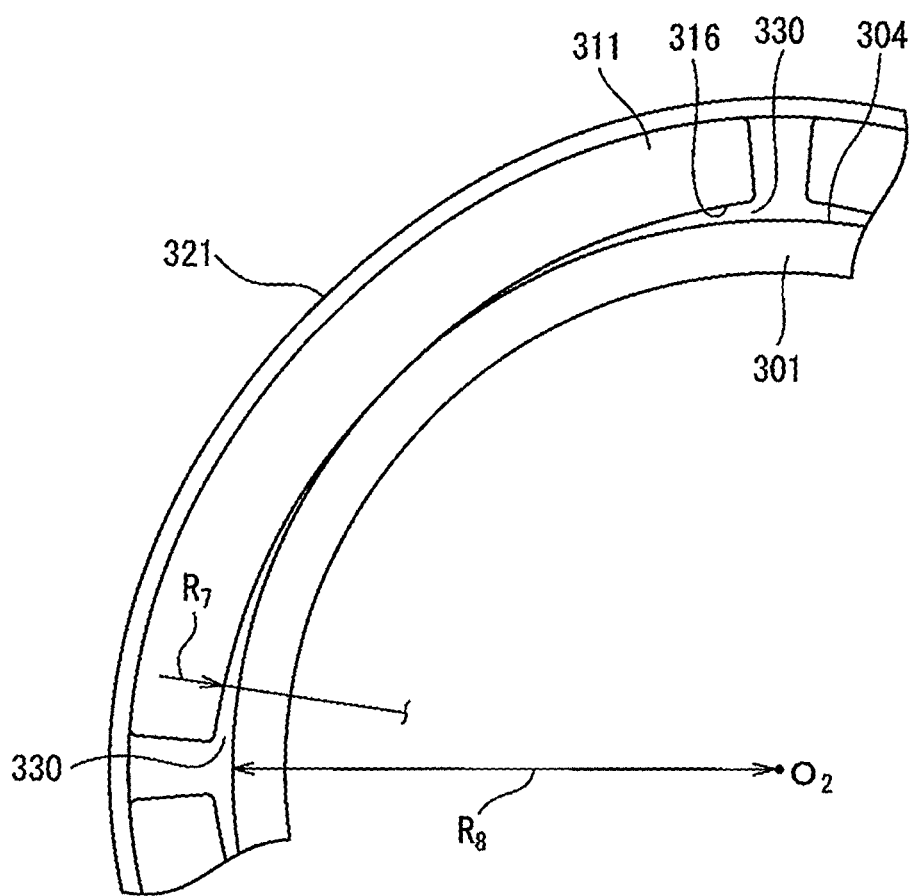
FIG. 15 is a partially enlarged view of FIG. 14.

In this embodiment, the radius of the inner surfaces 316 of the magnet segments 311 is set to be larger than the outer circumference surface 304 of the sleeve 301. Specifically, as illustrated in FIG. 15, $R_7$ is larger than $R_8$ ($R_7$>$R_8$), wherein R7 is the curvature radius of the inner surfaces 316 of the magnet segments 311 and R8 is the radius of the outer circumference surface 304 of the sleeve 301.

Such an arrangement provides gap 330 between the inner surfaces 316 of the magnet segments 311 and the outer circumference surface 304 of the sleeve 301 at circumferential end zones of the inner surfaces 316 of the magnet segments 311. The gap 330 includes a function that will be described later.

If the outer circumference of the magnet segment 311 is not circular, the tubular member 321 may be deformed along the outer circumference of the magnet segment 311 with a press fitting process to allow a surface-to-surface contact between the outer surface of the segment 311 and the inner surface of the tubular member 321 to thereby integrally assemble the two members.

With the tubular member 321 fitted over a radially outside of the magnet segments 311, it becomes possible to provide the rotator member 300 as an integrated member in which the magnet segments 311 are held between the sleeve 301 and the tubular member 321.

Figure 14:
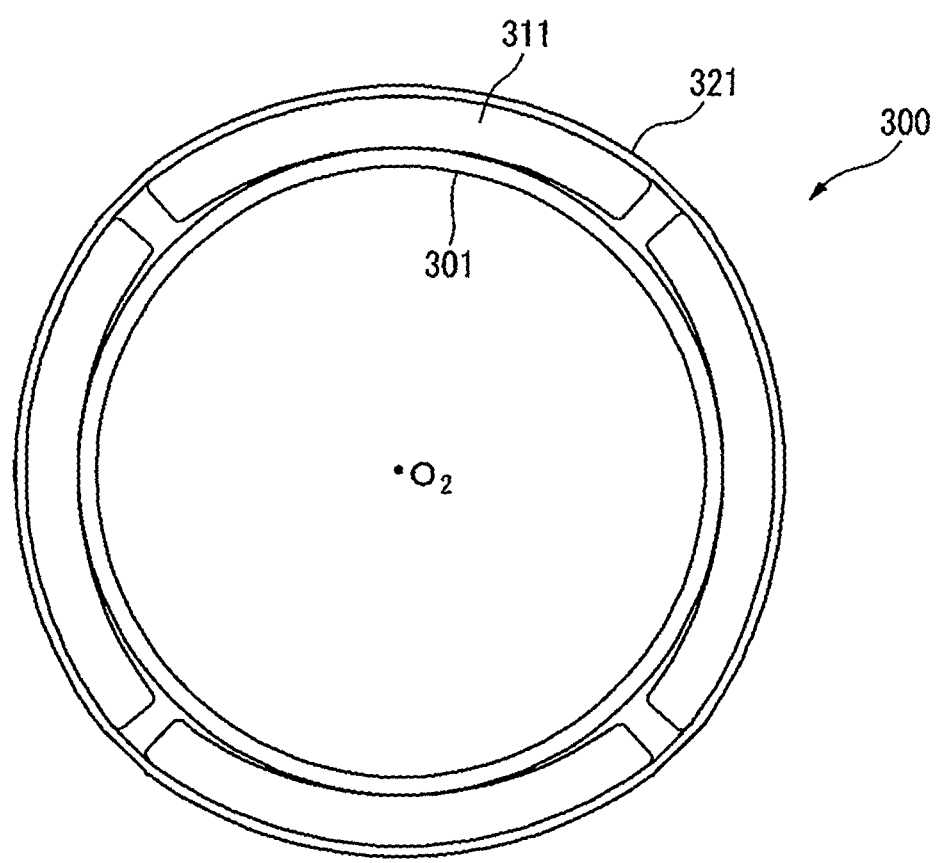
FIG. 14 illustrates the rotator member being assembled.

With the step S1 to the step S5, the rotator member 300 illustrated in FIG. 14 is produced. Since the rotator member 300 is pre-produced as an integrated member, an easy transportation of the rotator member 300 is accomplished. In the field of a built-in electric motor, for example, an assembly of such a rotator member is manufactured as a single product and distributed, in some cases. The rotator member 300 according to the embodiment has a general structure and is easy to handle, which is advantageous in this technical field from a point of view of distribution.

Below, the manufacturing method for the rotator according to an embodiment of the present invention will be further described with reference to FIG. 11. The method S20 for manufacturing the rotator includes step S6 to step S8. Specifically, in the step 6 the rotary shaft 200 illustrated in FIG. 2 is provided. For example, the tapered outer circumference surface 202 is formed by machining of an outer circumference surface of a tubular member. Before or after the abovementioned process, the cylindrical outer circumference surface 207 and the abutment portion 203 may be formed as necessary.

In the step S7, the rotator member 300 provided in the step S5 is fitted from an axially rear side of the rotary shaft 200. This step S7 will be described with reference to FIGS. 16 and 17. First, the sleeve 301 of the rotator member 300 is fitted from a side of the second end 303 to the axially rear end of the rotary shaft 200 provided in the step S6.

The rotary shaft 200 is held so that an end surface (not illustrated) of an axially second side (front side) thereof is pushed toward an axially first side (rear side), while the end 302 of the sleeve 301 of the rotator member 300 is pushed toward the axially front side. In other words, the rotator member 300 is pushed in the axially frontward direction as illustrated by an arrow E in FIG. 16.

Figure 16:
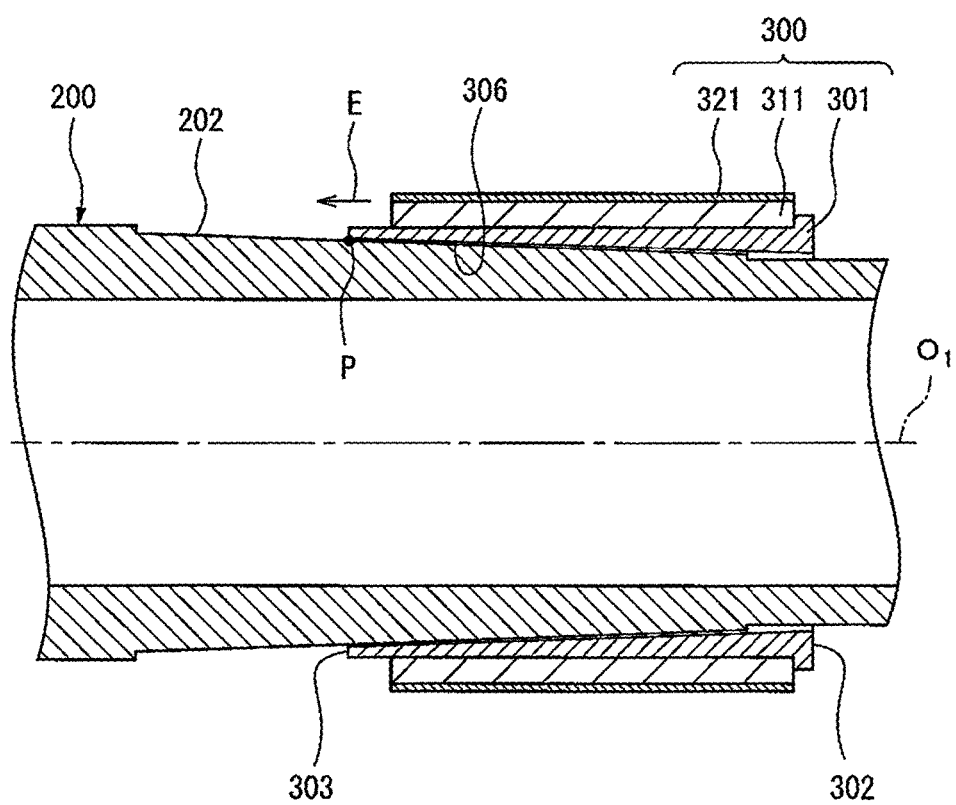
FIG. 16 is a sectional view illustrating a step of fixing the rotator member to the rotary shaft.
Figure 17:
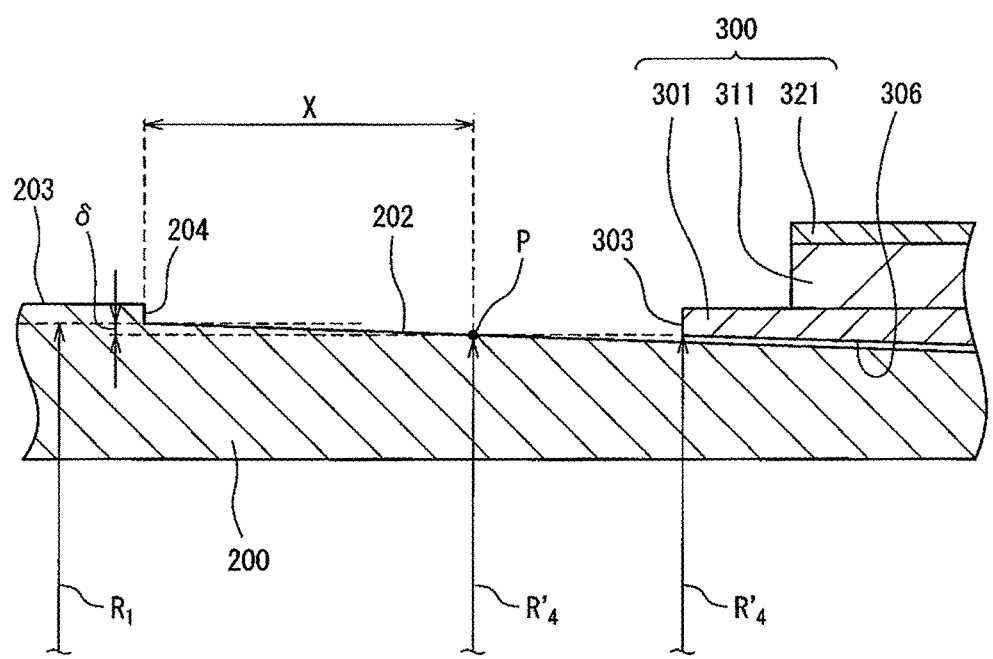
FIG. 17 is a partially enlarged sectional view of FIG. 16.

This causes a front end of the tapered inner circumference surface 306 of the sleeve 301 to contact the tapered outer circumference surface 202 of the rotary shaft 200 at a contact point P. This state is depicted in FIG. 16. It is preferable that as illustrated in FIG. 17, the radius of the tapered outer circumference surface 202 at the point P is equal to the radius $R_4'$ of the tapered inner circumference surface 306 of the second end 303 of the sleeve 301 provided in the step S1.

In the step S8 the rotator member 300 is further press-pushed in the axially frontward direction over the rotary shaft 200. More specifically, the rotator member 300 is press-pushed in the axially frontward direction to a certain position, e.g. to the position until the second end 303 of the sleeve 301 is brought into contact with the step 204 of the abutment portion 203, as illustrated in FIG. 17.

The sleeve 301 expands radially outward for a difference δ between the radius $R_1$ and the radius $R_4'$, as moving axially frontward for a distance x from the contact point P to the step 204. As a result, the rotator member 300 in this state is fixed by an interference fitting to the rotator shaft 200 with an interference of φ2δ. It is preferably noted that the sleeve 301 in this state may be deformed beyond its elastic deformation zone.

The sleeve 301 expands radially outward by the press-pushing force applied to the sleeve 301 until the sleeve 301 reaches the predetermined fixing position, which causes the magnet segments 311 to move outside the radial direction. With such a movement, the tubular member 321 receives a force applied in the outer direction and thus similarly expands outside the radial direction. Accordingly, the tubular member 321 stores an elastic compressive force that hold the magnet segments 311 and the sleeve 301 between the tapered outer circumference surface 202 of the rotary shaft 200 and the tubular member 321, generating pressing forces (surface pressing forces) between the surfaces in contact. The pressing forces firmly fix, against a movement in the circumferential direction, the magnet segments 311 to the outer circumference surface 304 of the sleeve 301, and the inner circumference surface 306 of the sleeve 301 to the tapered outer circumference surface 202 of the rotary shaft 200.

It is preferably noted that the inner circumference surface 306 of the sleeve 301 is brought into a surface-to-surface contact with the tapered outer circumference surface 202 of the rotary shaft 200 in almost all of the area (more than 90%) between the axially front end surface 322 of the tubular member 321 and the axially rear end surface 323 thereof.

Specific dimensions of the rotary shaft 200 and the sleeve 301 are presented below as an example. The taper ratio of both the tapered outer circumference surface 202 of the rotary shaft 200 and the tapered inner circumference surface 306 of the sleeve 301 is set to 1/100. The thickness of the sleeve 301 at the second end 303 of is set to 1 mm, and the axial length of the sleeve 301, i.e., the distance between the first end 302 and the second end 303, is set to 100 mm.

Therefore, the thickness of the sleeve 301 at the first end 302 results in 1.5 mm. In this case, when the diameter of the outer circumference surface 304 of the sleeve 301 is set to φ80 mm (i.e., the radius is 40 mm), the diameter of the tapered inner circumference surface 306 of the second end 303 results in φ78 mm (i.e., R4=39 mm), and the diameter of the tapered inner circumference surface 306 of the first end 302 results in φ77 mm (i.e., R3=38.5 mm).

On the other hand, when the outer diameter of the axial end 206 of the rotary shaft 200 is arranged at φ78.5 mm (i.e., R1=39.25 mm), and the outer diameter of the tapered outer circumference surface 202 of the rotary shaft 200 at a position 100 mm axially rearward from the axial front end 206 results in φ77.5 mm (i.e., the radius is 38.75 mm).

In this case, when the sleeve 301 is press-fitted over the rotary shaft 200 so that the second end 303 of the sleeve 301 contacts the step 204 of the rotary shaft 200, the sleeve 301 and the rotary shaft 200 are fixed with each other by an interference fitting of an interference of φ0.5 mm.

Figure 18:
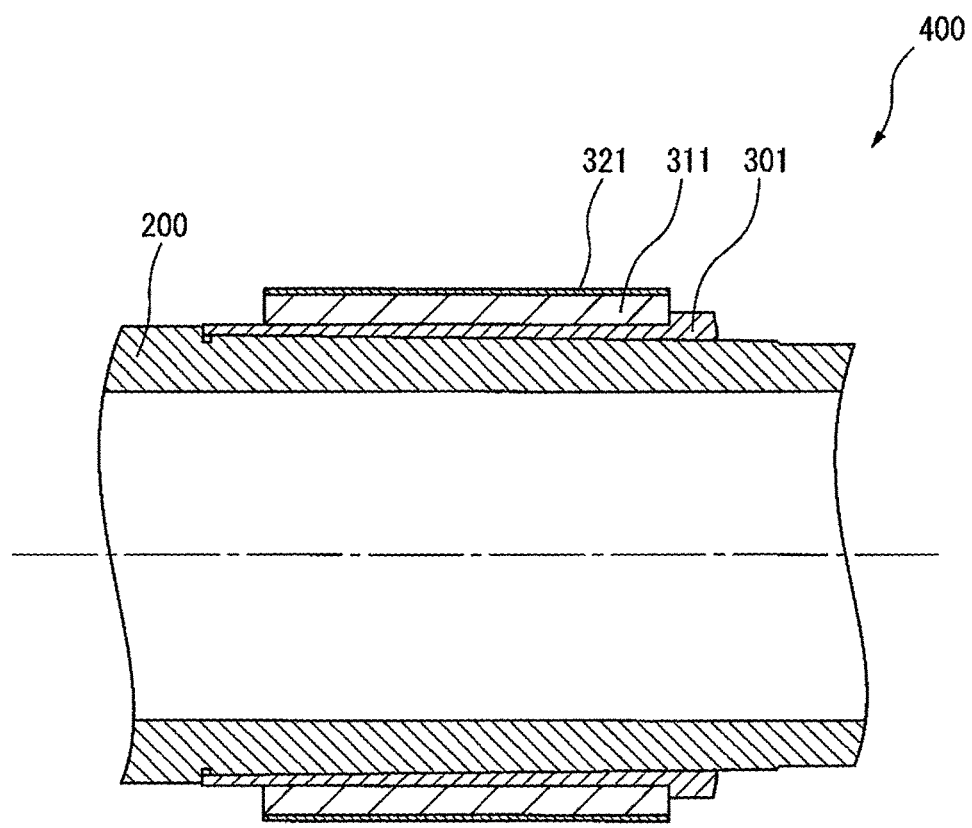
FIG. 18 is a sectional view of the rotator member fixed to the rotary shaft.

With completion of the step S8, the rotator member 300 is fixed to the rotary shaft 200 by an interference fitting, whereby a rotator 400 illustrated in FIG. 18 is produced. Thus, the step S7 and the step S8 compose a step S9 in which the rotator member 300 is fixed outside the radial direction to the rotary shaft 200 by an interference fitting.

As described above, in this embodiment the magnet segments 311 are disposed in the circumferential direction, and the curvature radius $R_7$ of the inner circumference surface 316 of each magnet segment 311 is set to be larger than the curvature radius $R_8$ of the outer circumference surface 304 of the sleeve 301. This prevents cracks of the magnets during the preparation of the rotator 400.

Figure 19:
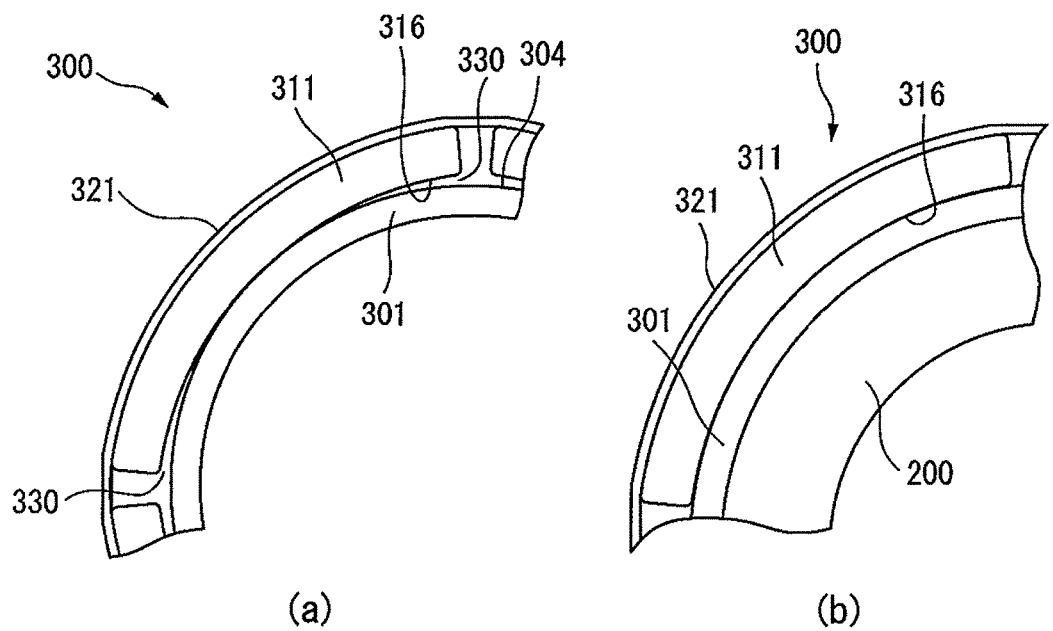
FIG. 19 illustrates the change of the state of the rotator member at a step when the rotator member is fixed to the rotary shaft.

FIG. 19 illustrate the prevention of cracks of the magnets, which will be described below. Section (a) of FIG. 19, corresponds to FIG. 15, and illustrates the rotator member 300 before press-fitted over the rotary shaft 200. Section (b) of FIG. 19, corresponds to FIG. 4, and illustrates the rotator member 300 after press-fitted over the rotary shaft 200.

As described previously, the gap 330 is formed between the inner circumference surfaces 316 of the magnet segments 311 and the outer circumference surface 304 of the sleeve 301 prior to the press-fitting of the rotator member 300 over the rotary shaft 200. When the rotator member 300 is press fitted over the rotary shaft 200 in the step S8, the rotator member 300 expands radially outward by the above difference δ.

As illustrated in section (b) of FIG. 19, the sleeve 301 expands radially outward so as to fill the gap 330, resulting in a surface-to-surface contact between the outer circumference surface 304 of the sleeve 301 and inner circumference surfaces 316 of the magnet segments 311. The gap 330 is formed due to the difference between the curvature radius $R_7$ of the inner circumference surfaces 316 of the magnet segments 311 and the radius $R_8$ of the outer circumference surface 304 of the sleeve 301. The size of the gap 330 is determined based on the expansion of the sleeve 301 in the step S8.

According to the configuration described above, the gap 330 functions as an "allowance" to allow expansion of the sleeve 301 and prevents application of excessive force from the sleeve 301 to the magnet segments 311 in the step S8, thereby cracks in the magnet segments 311 are prevented.

In this embodiment, the magnet segments 311 are composed of four pairs that are separately arranged in the circumferential direction, and are not continuous in a form of a ring. Such an arrangement can successfully prevent damages in the magnet segments 311 in the step S8 when a force is applied to the magnet segments 311, compared to the magnet in a form of a ring. In addition, with an adjustment of a size and a number of the magnet segments 311 to be used, an application of the segments 311 to a large size electric motor can be easily carried out.

According to the embodiment, as mentioned above, the sleeve 301 expands outside the radial direction so as to fill the gap 330, which allows a surface-to-surface contact between the outer circumference surface 304 and the inner circumference surfaces 316 of the magnet segments 311 in the step S8. This configuration permits the outer circumference surface 304 of the sleeve 301 and the inner circumference surfaces 316 of the magnet segments 311 to be firmly and tightly attached with each other with a pressing force evenly distributed between them in the rotator 400 with the assembly completed. Such a structure increases a friction force (fix torque) between the outer circumference surface 304 of the sleeve 301 and the inner circumference surfaces 316 of the magnet segments 311 to thereby efficiently prevent a relative movement of the magnet segments 311 with respect to the sleeve 301 in a driving operation of the electric motor 100.

Furthermore, in this embodiment the tapered surfaces 202 and 306 are used to expand the sleeve 301 to press fit the rotator member 300 over the rotary shaft 200 in the step S8. Such an arrangement allows uniform and highly precise expansion of the sleeve 301 to thereby stably hold the magnet segments 311 between the sleeve 301 and the tubular member 321, which enables the rotator 400 to include a firm structure, allowing the rotator 400 to be used in a motor for a product operated under a high rotation speed.

Moreover, in this embodiment, the process of press fitting the rotator member 300 over the rotary shaft 200 only requires a press machine for pushing the rotator member 300 in an axially one direction, and does not require any other complicated machines, which enables providing improved productivity and a decreased manufacturing cost.

According to the embodiment, there is no need to use a so-called "thermal insert" method which requires heating of the rotator member 300 and member of the rotary shaft 200 for press fitting. Therefore, high-temperature demagnetization of the magnets caused by heating with is prevented.

Since the "thermal insertion" is excluded in this embodiment, the rotator member 300 can be firmly fixed to the rotary shaft 200 even though a material with a small linear expansion coefficient such as carbon fiber, titanium or glass fiber is used.

Furthermore, according to the embodiment, with a proper adjustment of the degree (taper ratio, inclined angle with respect to the axial direction) of the tapered surfaces 202 and 306, it becomes possible to readily and freely determine an interference between the sleeve 301 and the tubular member 321. Therefore, application of the rotator member 300 to electric motors of various types and sizes is possible.

It is preferably noted that the tapered outer circumference surface 202 and the tapered inner circumference surface 306 may preferably be provided with the taper ratio in a range between 1/1000 and 1/30. This range of value will be described below. When the sleeve 301 is press fitted over the rotary shaft 200 with the taper ratio of the upper limit (1/30), an elastic compressed force is applied inside the radial direction from the sleeve 301 to the rotary shaft 200. Just after the sleeve 301 is press fitted over the rotary shaft 200, the elastic compressed force acts to cause the sleeve 301 to move to draw from the rotary shaft 200 along the tapered outer circumference surface 202.

Consequently, the inventor of the present invention found out as a result of examination tests that the taper ratio arranged larger than 1/30 (for example, 1/10, 1/5) would adversely present the problems to be followed. Specifically, when the sleeve 301 is press fitted over the rotary shaft 200, the force of the sleeve 301 to draw from the rotary shaft 200 tends to exceed a friction force between the sleeve 301 and the rotary shaft 200. This would highly result in a drop off of the sleeve 301 from the rotary shaft 200.

In addition, with the taper ratio larger than 1/30, a substantially large force is involved to press fit the sleeve 301 over the rotary shaft 200, which would require a larger manufacturing machine. From such a point of view, it is preferable to arrange the taper ratio with the maximum value of 1/30.

Regarding to the taper ratio of the minimum value (1/1000) on the contrary is such that with the taper ratio smaller than 1/1000, there is preferable a larger axial distance (the distance x mentioned previously) to obtain a predetermined interference φ0.5 mm in the example mentioned above) in the press fitting between the sleeve 301 and the rotary shaft 200. This deteriorates operational efficiency. Furthermore, the taper ratio smaller than 1/1000 may result in machining errors in an actual manufacturing process. From such a point of view, the minimum value of the taper ratio is preferably 1/1000. From the abovementioned point of view, the minimum value of the taper ratio is more preferably around 1/200 with a consideration of an actual manufacturing cost. Such a minimum value allows turning and cutting operations.

In another embodiment of the present invention, movement prevention structure may be provided between the sleeve 301 and the magnet segments 311 to prevent a relative movement between the sleeve 301 and the magnet segments 311. This structure will be described with reference to FIGS. 20 to 22. Reference numerals that are same as in the embodiment described above are applied to similar members with an exclusion of the descriptions thereof.

First, a rotator member 500 according to another embodiment of the present invention will be described below with reference to FIG. 20. Section (a) of FIG. 20, corresponding to section (a) of FIG. 19, illustrates a rotator member 500 to be press fitted over the rotary shaft 200. Section (b) of FIG. 20, corresponds to section (b) of FIG. 19, illustrates the rotator member 500 press fitted over the rotary shaft 200.

The rotator member 500 in this embodiment includes a movement prevention structure 501 on the outer circumference surface 304 of the sleeve 301. The movement prevention structure 501 is provided to prevent a relative movement of the sleeve 301 with respect to the magnet segments 311, and is configured to increase a friction coefficient between the sleeve 301 and the magnet segments 311. The movement prevention structure 501 may include, for example, a high frictional resin coating layer, an adhesive resin coating layer, a layer applied with a sandblast process, a coating layer including material for improvement of a friction coefficient, and a layer applied with a chemical surface process for improvement of a friction coefficient.

The movement prevention structure 501 may be made of a protrusion extending outside the radial direction from the outer circumference surface 304 of the sleeve 301. In this case, the magnet segment 311 may include on the inner circumference surface 316 an engaging portion for engagement with the protrusion. When the movement prevention structure 501 is made of a coating layer, the thickness thereof may preferably be 0.01 mm to 0.1 mm.

When the movement prevention structure 501 is made of the protrusion extending outside the radial direction from the outer circumference surface 304 of the sleeve 301, the height of the protrusion may preferably be 0.5 mm or higher and ⅓ or less of the thickness of the magnet segments 311. The process of providing the movement prevention structure 501 on the outer circumference surface 304 of the sleeve 301 may be carried out in the step S1 with the cutting operation of the outer circumference surface 304 of the sleeve 301, or may be carried out in the step S4 prior to the positioning of the magnet segments 311 over the sleeve 301.

Figure 20:
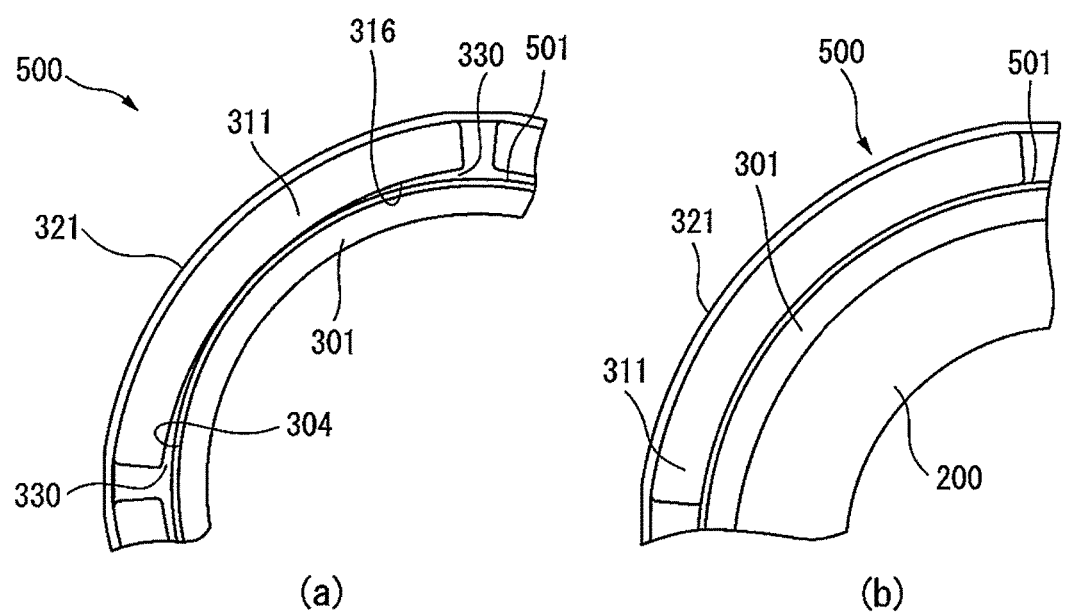
FIG. 20 is an enlarged view of the rotator member according to another embodiment.

As illustrated in section (b) of FIG. 20, when the sleeve 301 is expanded outside the radial direction by an interference with respect to the rotary shaft 200 so as to fill the gap 330, the outer circumference surface 304 of the sleeve 301 and the inner circumference surfaces 316 of the magnet segments 311 together make a surface-to-surface contact over the movement prevention structure 501. Prior preparation of the gap 330 prevents cracks in the magnet segments 311 due to the expansion of the sleeve 301 in the radial direction.

With the surface-to-surface contact between the outer circumference surface 304 of the sleeve 301 and the inner circumference surfaces 316 of the magnet segments 311, a relative movement of the magnet segments 311 with respect to the sleeve 301 and the tubular member 321 during a high speed rotation of the rotator member 500 in a driving operation of the electric motor 100 is effectively prevented.

A rotator member 510 according to a further embodiment of the present invention will be described with reference to FIG. 21. Section (a) of FIG. 21, corresponding to section (a) of FIG. 19, illustrates a rotator member 510 to be press fitted over the rotary shaft 200. Section (b) of FIG. 21, corresponding to section (b) of FIG. 19, illustrates the rotator member 510 fitted over the rotary shaft 200.

The rotator member 510 in this embodiment includes a movement prevention structure 511 provided on the inner circumference surface 316 of the corresponding magnet segment 311. Similarly, this movement prevention structure 511 is configured to increase a friction coefficient between the sleeve 301 and the magnet segment 311. The movement prevention structure 511 may be a protrusion extending radially inwardly from the inner circumference surface 316 of the magnet segment 311.

Figure 21:
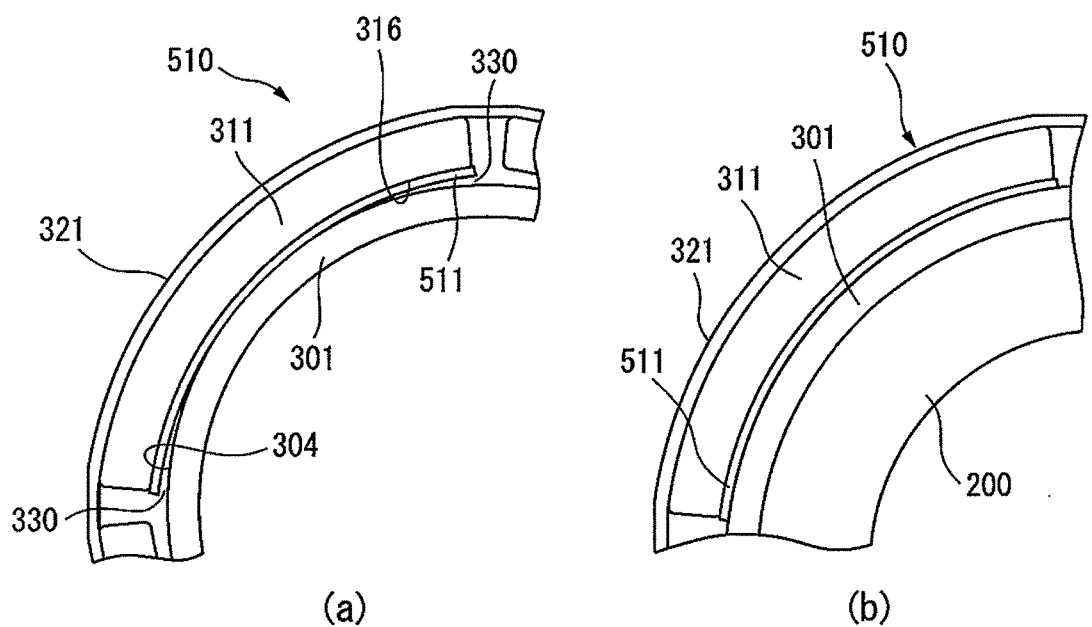
FIG. 21 is an enlarged view of the rotator member according to further another embodiment.

As illustrated in section (b) of FIG. 21, as the sleeve 301 expands outside the radial direction so as to fill the gap 330, the outer circumference surface 304 of the sleeve 301 and the inner circumference surface 316 of the magnet segment 311 make a surface-to-surface contact with each other via the movement prevention structure 511. Such a configuration effectively prevents a relative movement of the magnet segment 311 with respect to the sleeve 301 and the tubular member 321 during a high speed rotation of the rotator member 510 in a driving operation of the electric motor 100.

The process of providing the movement prevention structure 511 on the inner circumference surface 316 of the magnet segment 311 may be carried out in the step S2 with the preparation of the magnet segments 311, or carried out in the step S4 prior to the installation of the magnet segments 311 on the sleeve 301.

A rotator member 520 according to still another embodiment of the present invention will be described with reference to FIG. 22. Section (a) of FIG. 22, corresponding to section (a) of FIG. 19, illustrates a rotator member 520 to be press fitted over the rotary shaft 200. Section (b) of FIG. 22, corresponding to section (b) of FIG. 19, illustrates the rotator member 520 fitted over the rotary shaft 200.

The movement prevention structure 521 in the rotator member 520 according to this embodiment is independently formed and inserted between the sleeve 301 and the corresponding magnet segment 311. The movement prevention structure 521 has a significant friction coefficient with respect to the sleeve 301 and the magnet segment 311. The movement prevention structure 521 may be composed, for example, of a friction sheet with a process on the surface thereof for improvement of a friction coefficient, an adhesive sheet with an adhesive on the surface thereof, or a rubber sheet made, for example, of NBR or silicon provided with a tacking performance. The movement prevention structure 521 preferably has a thickness of 0.03 mm to 0.1 mm.

Figure 22:
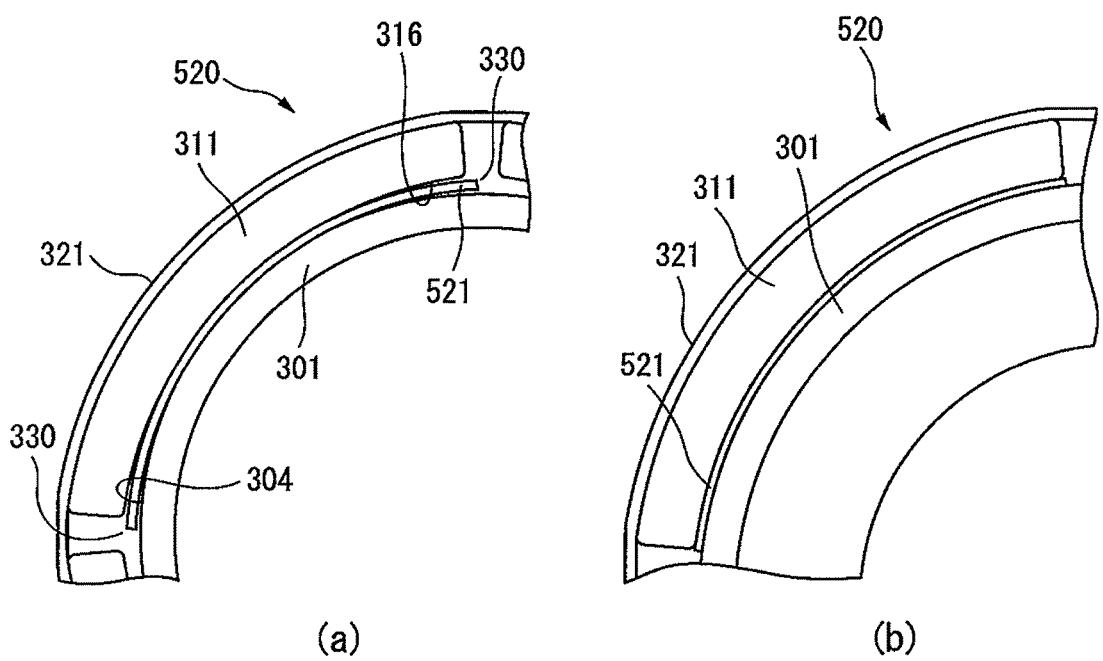
FIG. 22 is an enlarged view of the rotator member according to still another embodiment.

As illustrated in section (b) of FIG. 22, the expansion of the sleeve 301 outside the radial direction fills the gap 330, thereby creating a surface-to-surface contact between the outer circumference surface 304 of the sleeve 301 and the inner circumference surface 316 of the magnet segment 311 via the movement prevention structure 521. Due to this configuration, the magnet segments 311 do not move with respect to the sleeve 301 and the tubular member 321 during a high speed rotation of the rotator member 520 in a driving operation of the electric motor 100.

Although the above embodiment is described based on the magnet segments of a circular arc form provided with a certain curvature radius, the magnet segments may include other types of shapes. Such a configuration will be described with reference to FIG. 23.

FIG. 23 illustrates a rotator member 600 according to still another embodiment of the present invention, wherein section (a) of FIG. 23 is an external view of the rotator member 600 viewed from the axial direction, and section (b) of FIG. 23 is a partial enlarged view of section (a).

The rotator member 600 includes a sleeve 601, multiple magnet segments 611 disposed outside the radial direction of the sleeve 601, and a tubular member 321 covering the magnet segments 611 from a radially outside.

The sleeve 601 in this embodiment includes concave 602 inwardly recessing from an outer circumference surface 604. The concave 602 axially extend from one axial end of the sleeve 601 to the other axial end thereof, and each of which is defined by a bottom surface of a substantially flat plane and circumference end surfaces uprising from the respective circumference ends of the bottom surface. The concave 602 are circumferentially disposed on the outer circumference surface 604 with regular intervals. A convex 603 is provided between two adjacent concave 602 so as to project outside the radial direction from the bottom surface of the concave 602.

The magnet segments 611 each include an inner circumference surface 616 at a radially inner side thereof and an outer circumference surface 617 at a radially outer side thereof. In this embodiment the outer circumference surface 617 of the magnet segment 611 has a curved surface like in the abovementioned embodiment, while the inner circumference surface 616 of the magnet segment 611 has a substantially flat surface.

As depicted in FIG. 23, in the assembled rotator member 600, the magnet segments 611 are stored in the respective concave 602 formed in the sleeve 601 so as to allow surface-to-surface contacts between the inner circumference surfaces 616 of the magnet segments 611 and the bottom surfaces of the concave 602. The convexes 603 circumferentially disposed at both sides of the respective concave 602 prevent circumference movement of the magnet segments 611.

Each of the concave 602 may include axial end surfaces uprising from two axial ends of the bottom surface the concave 602. In this case, the magnet segments 611 are prevented from moving in the axial direction by the axial ends of the concave 602.

According to this embodiment, the operation of positioning the magnet segments 611 on the radial outer side of the sleeve 601 in the step S4 becomes easier. In addition, it becomes possible to prevent a relative movement of the magnet segments 611 with respect to the sleeve 601 in a driving operation of the electric motor in which the rotator member 600 is employed.

Figure 24:
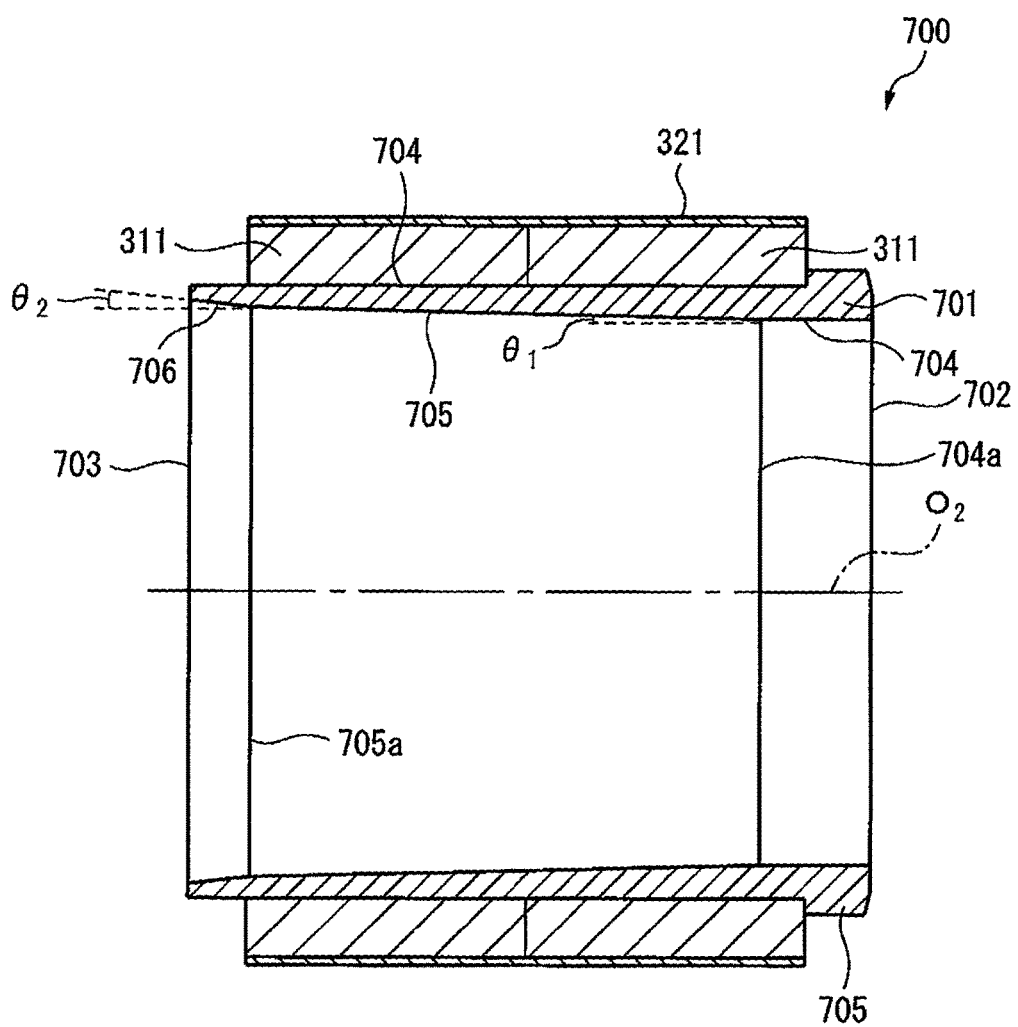
FIG. 24 illustrates the rotator member according to still further another embodiment.

A rotator member 700 according to still another embodiment of the present invention will be described with reference to FIG. 24. It is preferable that, like in the abovementioned embodiment, the same reference numerals are applied to similar elements with the description thereof being omitted. The rotator member 700 includes a tubular sleeve 701, a plurality of magnet segments 311 disposed outside the radial direction of the sleeve 301, and a tubular member 321 covering the magnet segments 311 from outside the radial direction.

The sleeve 701 is made of a tubular member having a center axis line $O_2$, and includes a first end 702 at an axially rear side (i.e., axial first side), a second end 703 at an axially front side (i.e., axial second side), and a cylindrical outer circumference surface 704 extending in the axial direction. The sleeve 701 has a protrusion 705 projecting outside the radial direction from the outer circumference surface (cylindrical surface) 704 at the axially rear end thereof. The protrusion 705 is an example for easy arrangement of the magnets in the axial direction during a manufacturing process.

The sleeve 701 includes a cylindrical surface 704 extending radially frontwardly from the first end 702, a tapered inner circumference surface 705 and a tapered inner circumference surface 706 both continuously expanding outside the radial direction toward an axially frontward direction. The radius of the cylindrical surface 704 is constant in the direction from the first end 702 toward the second end 703.

The first tapered inner circumference surface 705 is a conical surface that extends from an axially frontward end edge 704A of the cylindrical surface 704 and has a first inclined angle $\theta_1$ inclined with respect to the axis $O_2$. The second tapered inner circumference surface 706 is a conical surface that extends from an axially frontward end edge 705A of the first tapered inner circumference surface 705 to the axially front end of the second end 703 and has a second inclined angle $\theta_2$ inclined with respect to the axis $O_2$. The first angle $\theta_1$ is arranged to be smaller than the second angle $\theta_2$.

As described above, the present invention uses the permanent magnet segments that are not ring-shaped but separated at least in the circumferential direction. In fixing the sleeve to the rotary shaft, the tapered surfaces are used to expand the sleeve for a press fit over the rotary shaft. This can provide the sleeve and the tubular member with interference larger than interference by a thermal insert, which allows firm fixations of the magnet segments and the sleeve with respect to the rotary shaft. Since the magnet segments are separated in the circumferential direction, the magnet segments do not crack even under a large interference, whereby the magnet segments are firmly held between the sleeve and the tubular member. This further strengthens the structure of the rotator member. As a result, the rotator member can be applied to a rotary electric machine operated at a higher rotation speed.

In addition, the process of fixing the sleeve to the rotary shaft can be simplified, excluding use of complicated manufacturing machines. Therefore, it is possible to provide improved manufacturing efficiency and a reduced manufacturing cost.

Since the magnet segments are separated in the circumferential direction, any cracks in the magnet segments due to an expansion of the sleeve in the radial direction in a process of fixing the sleeve to the rotary shaft are effectively prevented. Therefore, no cracks in the magnets are found even under a fixation between the rotator member and the rotary shaft with a larger interference. Accordingly, the rotator member can be operated under a higher rotation speed compared to any conventional rotator members.

The magnet segments separated in the circumferential direction allows an easy production of the magnet segments and a utilization of relatively large magnet segments. With the use of the larger magnet segments, it becomes possible to manufacture a rotary electric machine with larger torque that is not obtained by a magnet in a form of a ring. Accordingly, the present invention can rotate a rotary electric machine with larger torque and higher rotation speed, so that a rotary electric machine with higher output power can be provided.

Moreover, although the embodiment described above has eight magnet segments disposed in the circumferential direction, any number of magnet segments can be provided under such a condition that two or more magnet segments are disposed in the circumferential direction. In addition, two neighboring magnet segments may be provided with a gap between them, or may be in contact with each other.

The tapered outer circumference surface of the rotary shaft and the tapered inner circumference surface of the sleeve may include a tapered surface whose curvature radius changes in the axial direction like a tapered surface of an exponential function, besides the linear tapered surface.

In the embodiment described above, although the tubular member is press fitted on the radially outside of the magnet segments 311 (step S5), a material in a form of a sheet, belt, string or thread may be wounded on the radially outside of the magnet segments 311 to assemble the rotator member 300.

Furthermore, although the above embodiment describes the present invention that is applied to an electric motor, the present invention can be properly applied to any rotary electric machines including a generator.

The present invention has been described above through the embodiments, which, however, do not intend to limit the scope of the invention set forth in the claims. Furthermore, not all of the combinations of the features described in the embodiments intend to be in need of the features or methods of the present invention. Moreover, it would be obvious for a person skilled in the art to be able to modify or revise the embodiments described above. It would be obvious from the description of the claims that any embodiments with such modification or revision would be included in the technical scope of the present invention.

It is preferable that an execution procedure in each process including motions, processes, steps and stages in the devices, systems, programs and methods described in the claims, the description and the drawing do not specify "before" or "prior to", and thus they can be carried out in any desired order, unless a preceding output is used in a following process. As a matter of convenience, although terms such as "first" and "next" may be used in any of the claims, the description and the action flows in the drawing, they do not intend to specify any execution order.

The invention claimed is:

1. A rotator member to be fixedly press fitted to a rotary shaft of a rotary electric machine, the rotator member comprising:
 a tubular sleeve having a first end at an axially first side and a second end at an axially second side;
 a plurality of magnet segments arranged at radially outside of the sleeve so as to align in the circumferential direction; and
 a tubular member adapted to cover the magnet segments from a radially outer side to hold the magnet segments between the tubular member and the sleeve,
 wherein the sleeve has an inner circumference surface that includes a tapered surface, the tapered surface continuously expanding radially outward as it extends in a direction from the first end toward the second end,
 wherein the sleeve does not include a hole having an opening at the inner circumference surface of the sleeve, wherein the inner circumference surface of the sleeve further includes a cylindrical surface of a constant radius extending from the first end toward the second end, in addition to the tapered surface, wherein the tapered surface includes a linearly tapered surface extending from the cylindrical surface toward the second end.

2. The rotator member of claim 1, wherein the tapered surface of the sleeve is a linearly tapered surface, or includes a plurality of linearly tapered surfaces connected to each other and inclined with respect to an axis of rotation at different angles from each other.

3. The rotator member of claim 2, wherein the linearly tapered surface has a taper ratio of 1/200 to 1/30.

4. The rotator member of claim 1, wherein a gap is formed at least partially between the sleeve and the magnet segments.

5. The rotator member of claim 1 further comprising a movement prevention structure for prevention of a relative movement between the sleeve and the magnet segments.

6. The rotator member of claim 1, wherein the tubular member includes:

carbon fiber, glass fiber, aramid fiber, silicon carbide fiber, boron fiber, titanium alloy fiber, ultra high molecular weight polyethylene, or polybutylene terephthalate fiber;

fiber reinforced resin including carbon fiber, glass fiber, aramid fiber, silicon carbide fiber, boron fiber, titanium alloy fiber, ultra high molecular weight polyethylene, or polybutylene terephthalate fiber; or nonmagnetic metal.

7. A rotator comprising:

a rotary shaft having an outer circumference surface expanding radially outward as it extends in a direction from an axial first side toward an axial second side; and the rotator member of claim 1, the rotator member being fixed to the rotary shaft on a radially outside of the rotary shaft so that the second end of the sleeve is positioned at the axial second side of the rotary shaft relative to the first end of the sleeve, wherein the sleeve is deformed so as to expand radially outward by the rotary shaft when the rotator member is fixed to the rotary shaft, so that the outer circumference surface of the sleeve and the inner circumference surfaces of the magnet segments are brought into a pressured contact with each other.

8. The rotator of claim 7, wherein the inner circumference surface of the sleeve and the outer circumference surface of the rotary shaft contact each other in their almost entire areas where the tubular member is disposed.

9. A rotary electric machine comprising the rotator of claim 7.

10. A rotator member to be fixedly press fitted to a rotary shaft of a rotary electric machine, the rotator member comprising:

a tubular sleeve having a first end at an axially first side and a second end at an axially second side;

a plurality of magnet segments arranged at radially outside of the sleeve so as to align in the circumferential direction; and a tubular member adapted to cover the magnet segments from a radially outer side to hold the magnet segments between the tubular member and the sleeve, wherein the sleeve has an inner circumference surface that includes a tapered surface, the tapered surface continuously expanding radially outward as it extends in a direction from the first end toward the second end, wherein the sleeve does not include a hole having an opening at the inner circumference surface of the sleeve, wherein the outer circumference surface of the sleeve is cylindrical, wherein the inner circumference surface of each of the magnet segments is a circular arc and has a radius of curvature that is larger than a radius of curvature of the outer circumference surface of the sleeve.

\* \* \* \* \*